United States Patent [19]

Kawamura et al.

[11] Patent Number: 4,850,028
[45] Date of Patent: Jul. 18, 1989

[54] IMAGE PROCESSING METHOD AND APPARATUS THEREFOR

[75] Inventors: Naoto Kawamura; Miyuki Enokida, both of Yokohama, Japan

[73] Assignee: Canon Kabushiki Kaisha, Tokyo, Japan

[21] Appl. No.: 902,320

[22] Filed: Aug. 29, 1986

[30] Foreign Application Priority Data

| Sep. 4, 1985 | [JP] | Japan | 60-196186 |
| Sep. 4, 1985 | [JP] | Japan | 60-196187 |
| Sep. 4, 1985 | [JP] | Japan | 60-196188 |
| Oct. 18, 1985 | [JP] | Japan | 60-233032 |
| Nov. 29, 1985 | [JP] | Japan | 60-269881 |
| Dec. 13, 1985 | [JP] | Japan | 60-281621 |
| Dec. 13, 1985 | [JP] | Japan | 60-281624 |
| Dec. 13, 1985 | [JP] | Japan | 60-281625 |
| Dec. 20, 1985 | [JP] | Japan | 60-287111 |

[51] Int. Cl.⁴ .......................... G06K 9/32; H04N 5/14
[52] U.S. Cl. ........................................ 382/46; 382/47; 358/160; 340/727
[58] Field of Search .............. 358/160, 22, 183; 382/44, 46, 47; 340/724, 727, 731

[56] References Cited

U.S. PATENT DOCUMENTS

| 4,563,703 | 1/1986 | Taylor et al. | 358/160 |
| 4,611,232 | 9/1986 | Searby | 358/160 |
| 4,618,991 | 10/1986 | Tabata et al. | 382/46 |
| 4,639,791 | 1/1987 | Masaki | 258/300 |
| 4,647,971 | 3/1987 | Norman, III | 358/160 |
| 4,667,236 | 5/1957 | Dresdner | 358/160 |
| 4,712,185 | 12/1987 | Aoki | 382/46 |

FOREIGN PATENT DOCUMENTS 3419063 11/1984 Fed. Rep. of Germany .
03712 10/1982 World Int. Prop. O. .

Primary Examiner—James J. Groody
Assistant Examiner—Michael D. Parker
Attorney, Agent, or Firm—Fitzpatrick, Cella, Harper & Scinto

[57] ABSTRACT

There is disclosed an image processing apparatus capable of rotation or size change of an image, without lack of pixel data after image processing. For this purpose a destination address is calculated from a source signal, then source addresses are determined corresponding to the vicinity of the thus calculated destination address, and data values for such vicinity area are determined from the source data corresponding to such source addresses.

22 Claims, 57 Drawing Sheets

MAIN-SCAN DIRECTION $l = \alpha(|\sin\theta| + |\cos\theta|)$ $m = \beta(|\sin\theta| + |\cos\theta|)$

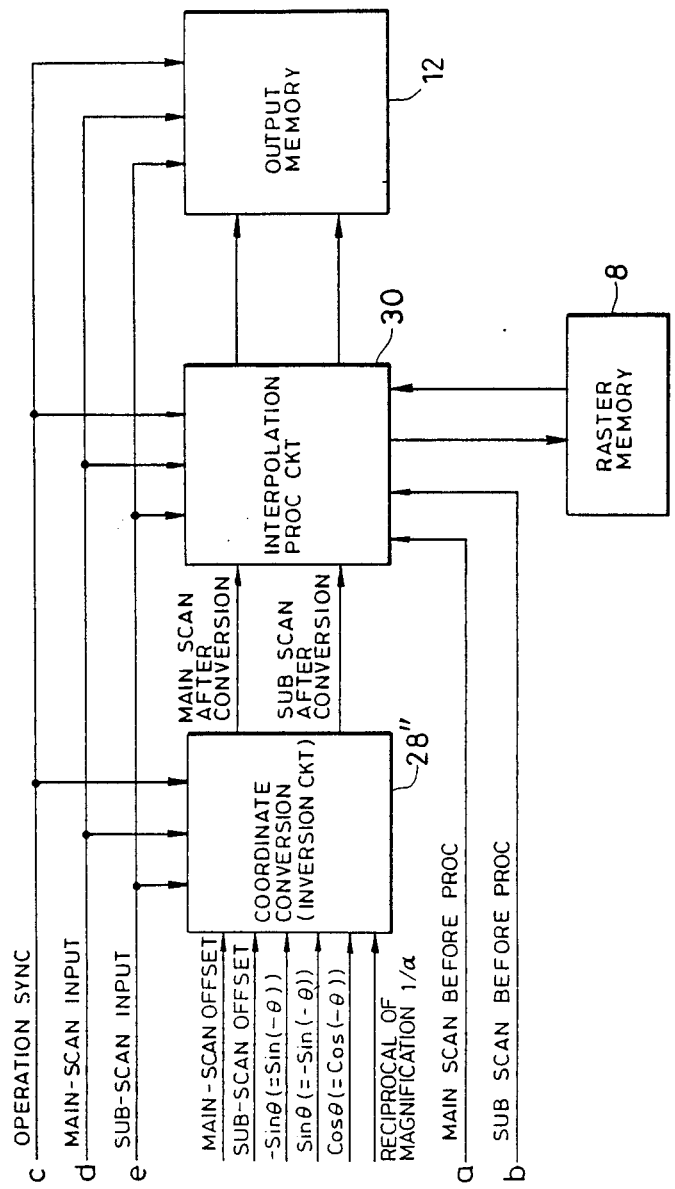

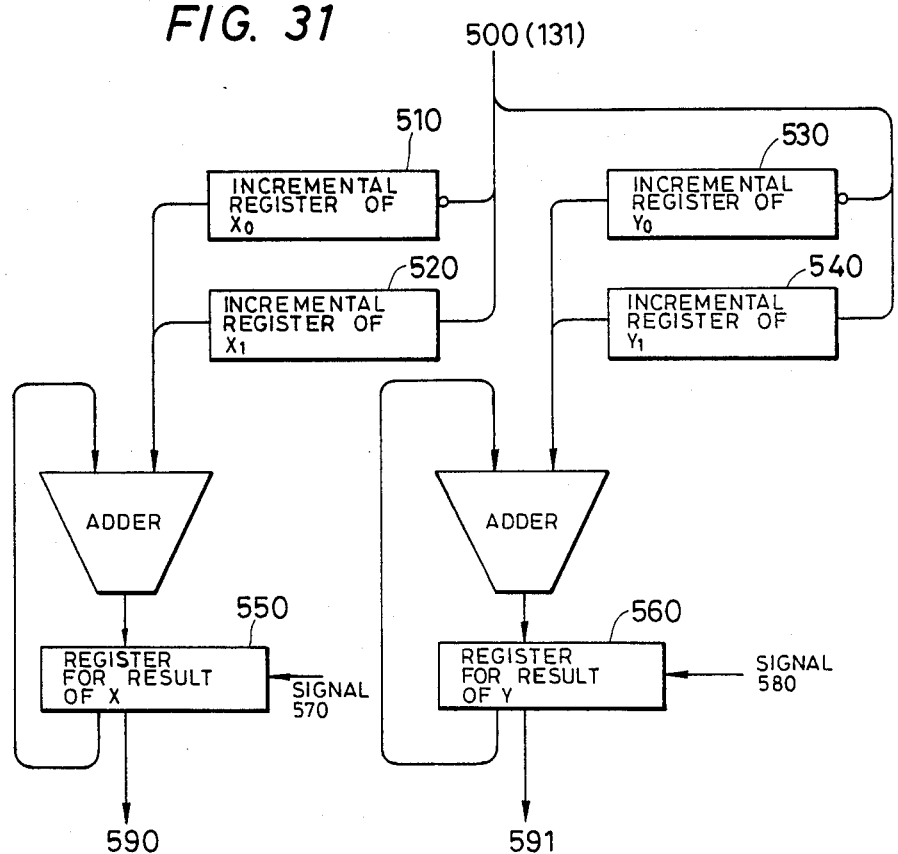

FIG. 32
| CLK | | | | | |
|---|---|---|---|---|---|
| CARRY | | 0 | 1 | 0 | 1 |
| INCREMENTAL REGISTER OF X | | 0.866025 | 1.366025 | 0.866025 | 1.366025 |
| INCREMENTAL REGISTER OF Y | | -0.5 | 0.366025 | -0.5 | 0.366025 |
| REGISTER FOR RESULT OF X | | 0.866025 | 2.23305 | 3.098075 | 4.4641 |
| REGISTER FOR RESULT OF Y | | -0.5 | -0.133975 | -0.633975 | -0.26795 |
FIG. 33
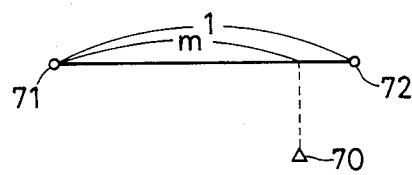
FIG. 34
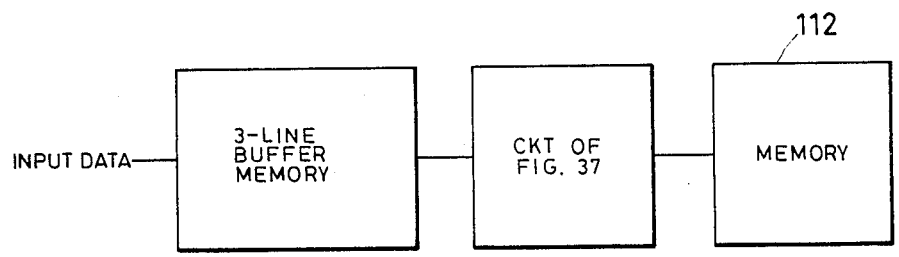

| ROTATIONAL ANGLE | COORDINATE CONVERSION |
|---|---|
| 0 ~ 45° | ORIGINAL |
| 45° ~ 90° | $A(X,Y) \rightarrow (Y,X)$ |
| 90° ~ 135° | $A(X,Y) \rightarrow (-Y,X)$ |
| 135° ~ 180° | $A(X,Y) \rightarrow (-X,Y)$ |
| 180° ~ 225° | $A(X,Y) \rightarrow (-X,-Y)$ |
| 225° ~ 270° | $A(X,Y) \rightarrow (-Y,-X)$ |
| 270° ~ 315° | $A(X,Y) \rightarrow (Y,-X)$ |
| 315° ~ 360° | $A(X,Y) \rightarrow (X,-Y)$ |

IMAGE PROCESSING METHOD AND APPARATUS THEREFOR

BACKGROUND OF THE INVENTION

1. Field of the Invention

The present invention relates to an image processing method for rotation or size change of an image and an apparatus therefor.

2. Related Background Art

In a conventional apparatus for rotation, enlargement or reduction of a digital image, such process has been conducted after input image data are once stored in a memory. The amount of information of the input image is generally larger than the corresponding amount processed image data, so that storage of the former requires a larger memory than the storage of the latter. Consequently the method of storing the input image information in a memory is inferior, in terms of memory cost and magnitude of circuitry, to a method of processing the input data in synchronization with a synchronization signal and storing the processed data in succession in an output memory.

On the other hand, the method of processing the input image data in consecutive manner for image rotation, enlargement or reduction in synchronization with a synchronization signal has a drawback of image quality deterioration because the processed data are sometimes not synchronized with the desired pitch of output signals, resulting in missing image data or in a misalignment of the image. FIGS. 1A and 1B illustrate such an example, wherein FIG. 1A shows the pitch of an original image, while, in FIG. 1B, broken lines indicate the pitch of an output image and solid lines indicate the pitch of an image obtained by a rotation of 35° of the original image. Each rectangle corresponds to a pixel, and the value of each pixel of the rotated image is given to an output pixel, or broken-lined rectangle, in which the center of said rotated image pixel is positioned. In such image processing, the hatched output pixels become missing pixels, i.e., pixels to which no corresponding image data is assigned. FIG. 1C shows similar missing pixels in an image processing of a rotation of 38° combined with image size variations of 80% in the main scanning direction and 120% in the sub scanning direction.

Also in such conventional apparatus, for example in the case of an image rotation of 30° as shown in FIG. 1D, the outputting of the processed result image is started from a pixel on a line 215 in the sub-scanning direction of the original image, and the addresses of pixels 212, 213 for starting the outputting of processed image are obtained by complicated calculations. Such method, when applied to an apparatus requiring a high image quality such as in a color image processing or a high speed, requires a long time, or requires a large amount of hardware for achieving such process, or eventually results in a deteriorated image quality.

SUMMARY OF THE INVENTION

An object of the present invention is to provide an image processing method and an apparatus therefor, not associated with such drawbacks as mentioned above.

Another object of the present invention is to provide an image processing method and an apparatus therefor, capable of image rotation or image size variation on scanned input image data (source data) in successive manner in synchronization with a scanning synchronization signal.

Still another object of the present invention is to provide an image processing method and an apparatus therefor, capable, in image rotation or image size variation on input image data in successive manner, of providing an output image without missing pixels or misalignment in pixels.

Still another object of the present invention is to provide an image processing method and an apparatus therefor, capable of image rotation of an arbitrary angle.

Still another object of the present invention is to provide an image processing method and an apparatus therefor, capable of preventing image quality deterioration in image rotation or image size variation.

The foregoing and still other objects and features and advantages of the present invention will become fully apparent from the following description of the preferred embodiments to be taken in conjunction with the attached drawings.

BRIEF DESCRIPTION OF THE DRAWING

FIGS. 22A and 22B are block diagrams of a second variation of the first embodiment;

FIG. 30 is a timing chart showing signals in the circuit shown in FIG. 29;

FIG. 31 is a block diagram of a rear half of the address generating circuit;

FIG. 32 is a timing chart showing signals in the circuit shown in FIG. 31;

FIG. 33 is a schematic chart showing the method of weighted averaging;

FIG. 34 is a schematic block diagram of an image processing apparatus;

DETAILED DESCRIPTION OF THE PREFERRED EMBODIMENTS

Figure 2:
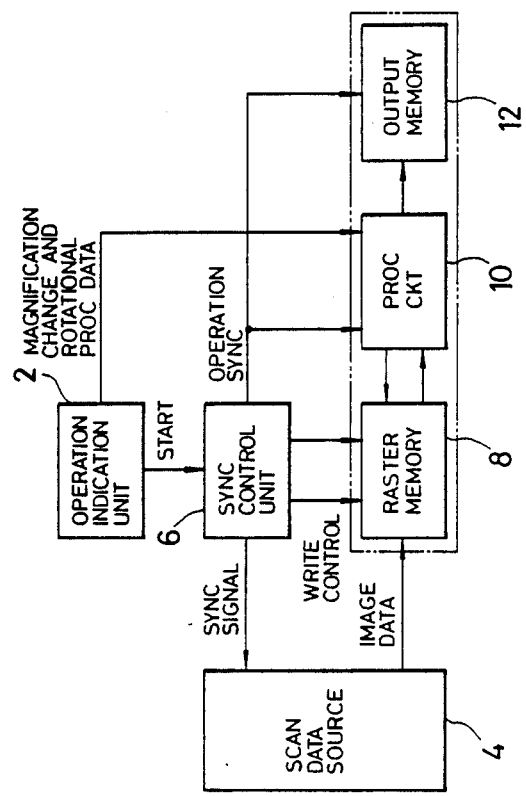
FIG. 2 is a schematic diagram of a first embodiment of the present invention.
Figure 3A:
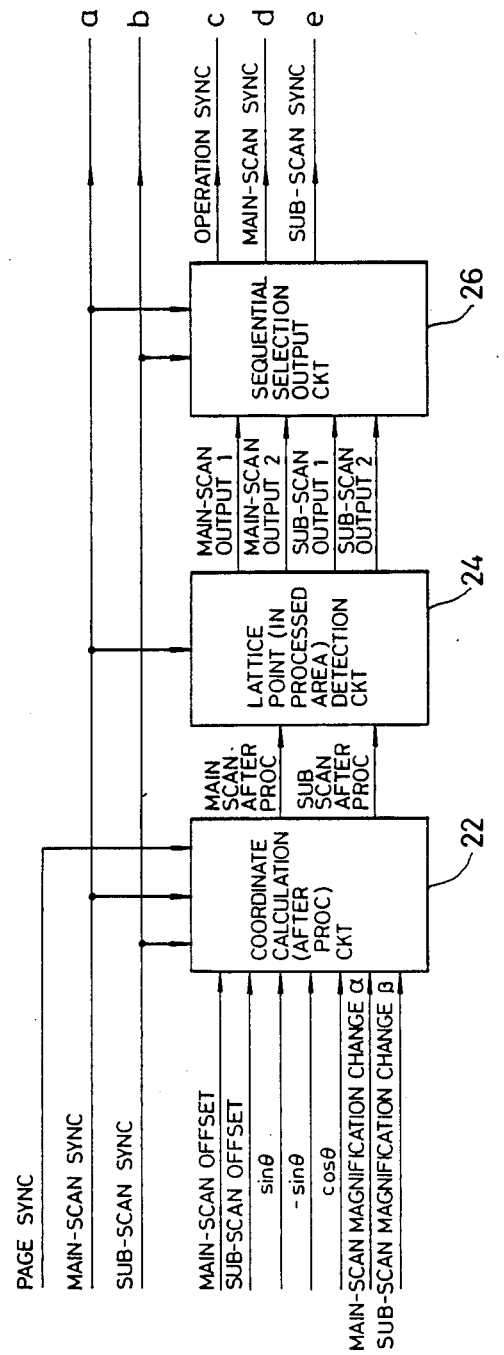
FIG. 3A is a block diagram of the front half of said embodiment.
Figure 3B:
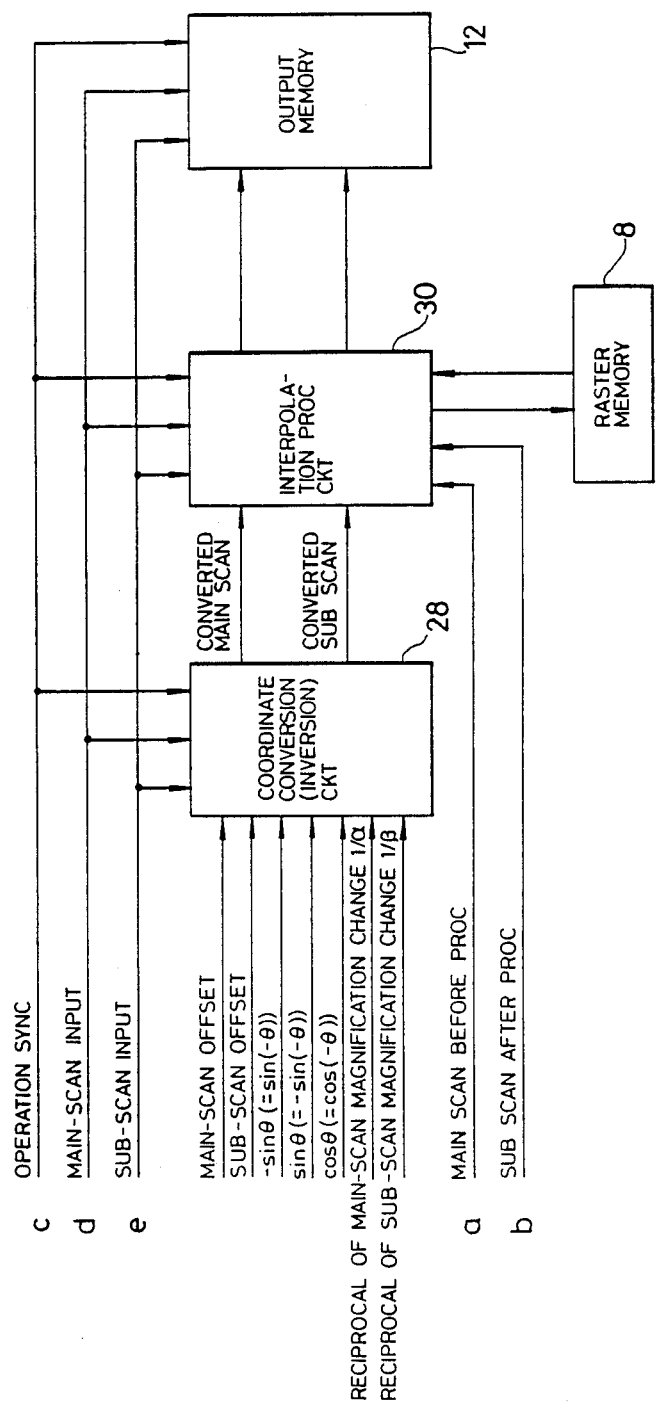
FIG. 3B is a block diagram of the rear half of said embodiment.
Figure 4:
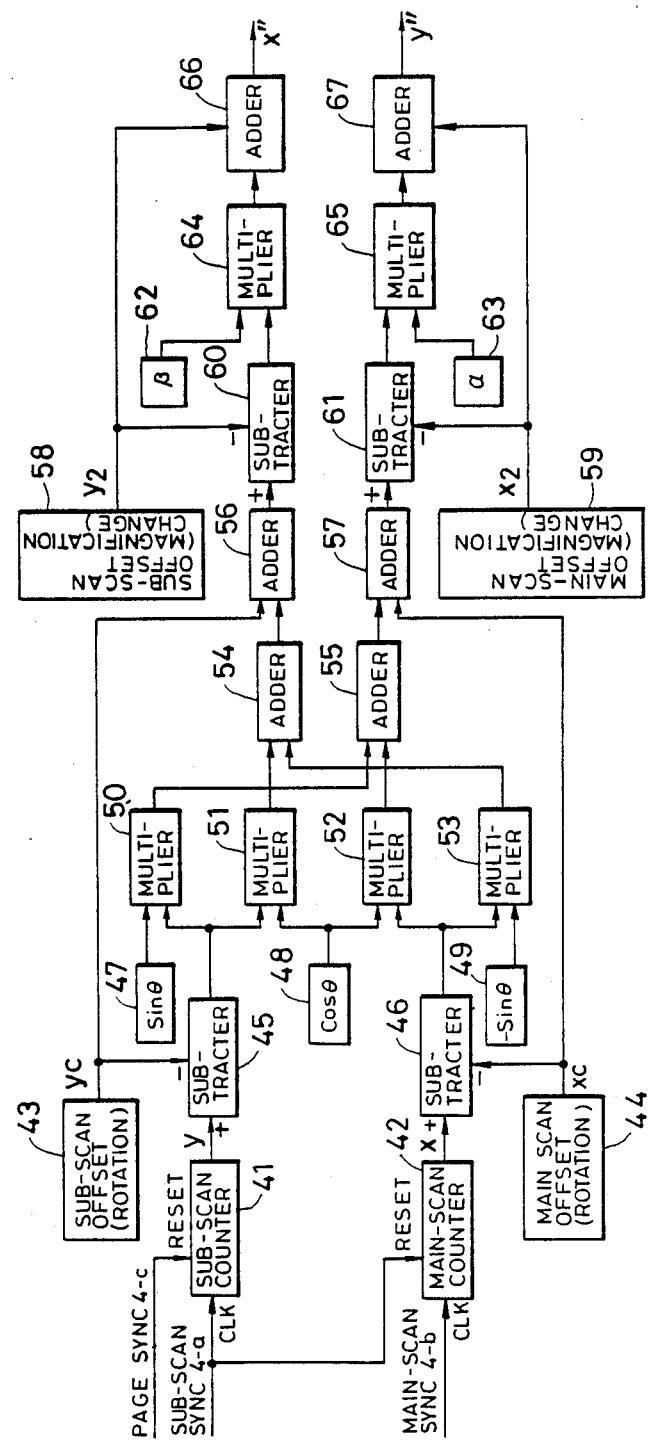
FIG. 4 is a more detailed block diagram of a circuit for calculating coordinates after rotation shown in FIG. 3A.
Figure 5A:
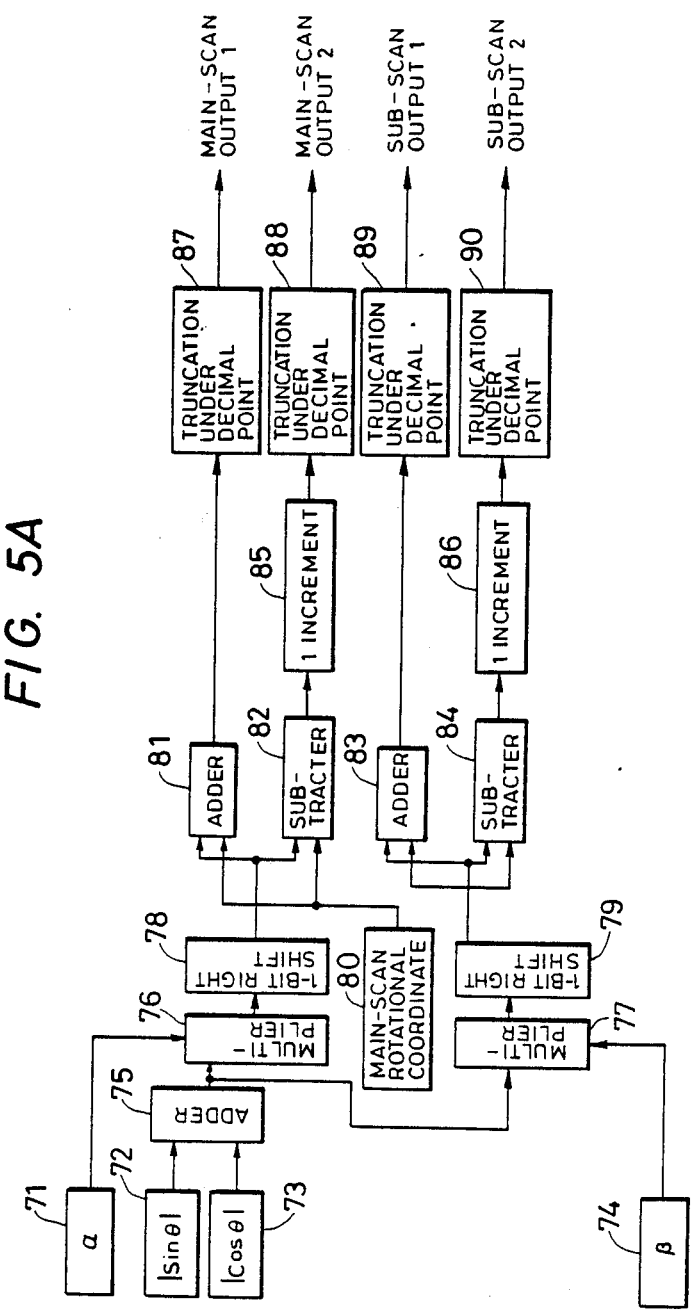
FIGS. 5A and 5B are more detailed block diagrams of an in-area lattice point detection circuit shown in FIG. 3A.
Figure 6:
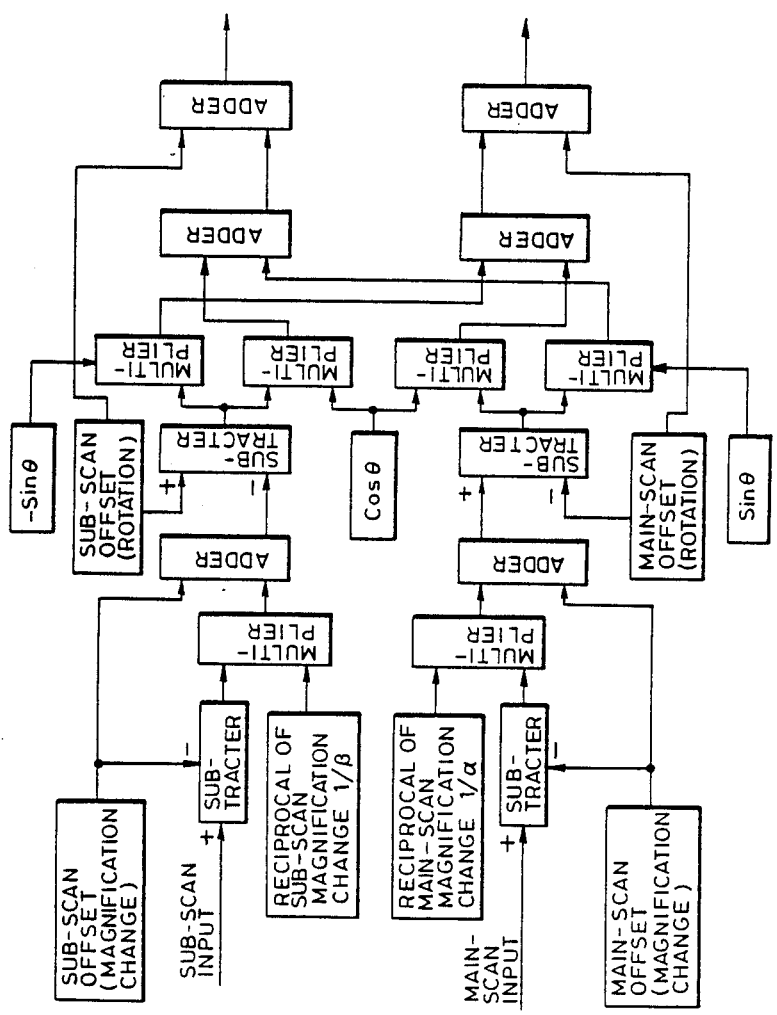
FIG. 6 is a more detailed block diagram of a coordinate inverse conversion circuit shown in FIG. 3B.
Figure 7:
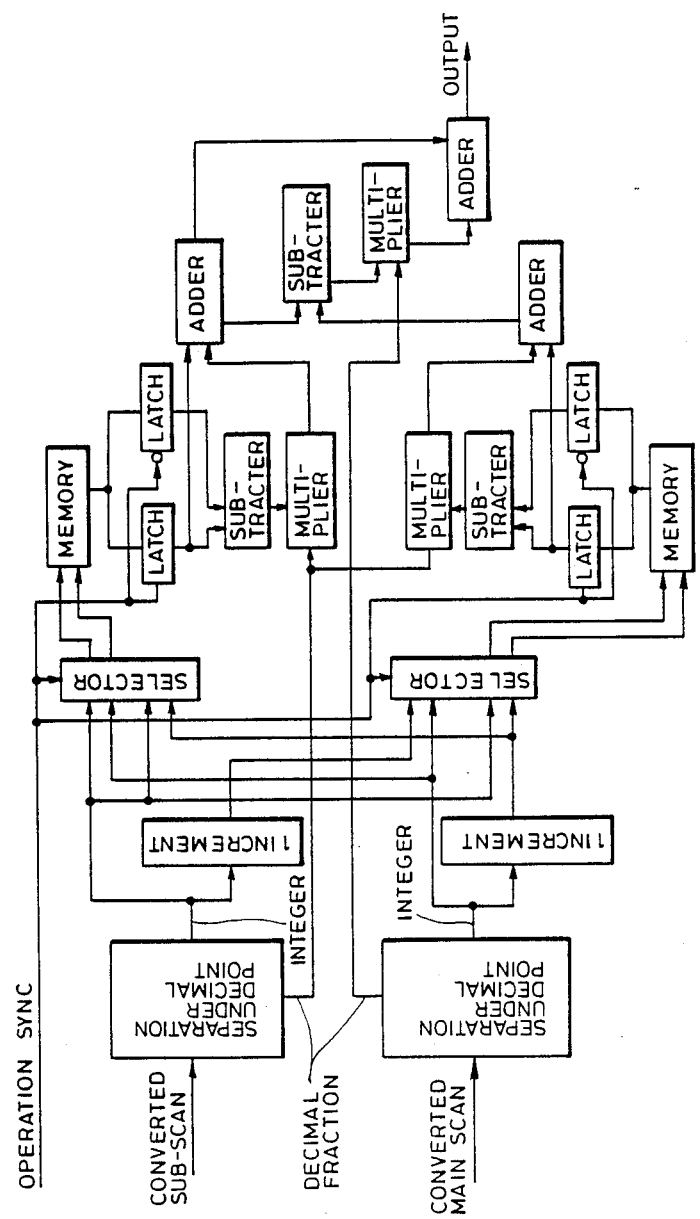
FIG. 7 is a more detailed block diagram of an interpolation circuit shown in FIG. 3C.
Figure 8:
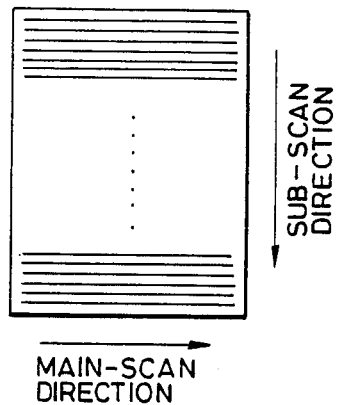
FIG. 8 is a schematic view of image scanning state.
Figure 9:
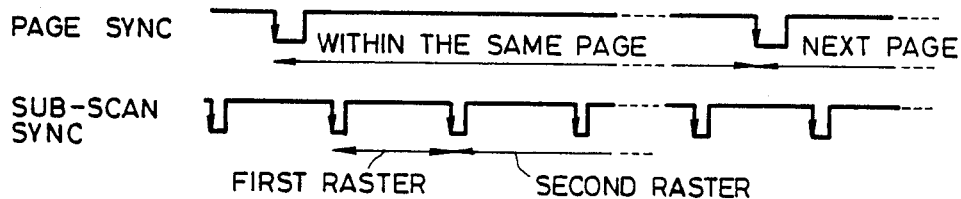
FIG. 9 is a wave form chart showing a page synchronization signal and a sub-scan synchronization signal.
Figure 10:
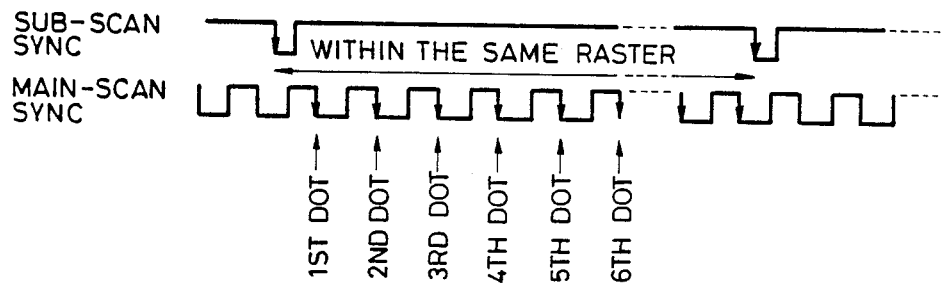
FIG. 10 is a wave form chart showing a sub-scan synchronization signal and a main-scan synchronization signal.
Figure 11A:
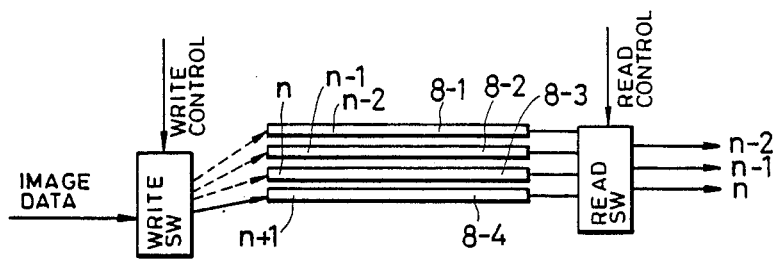
FIG. 11A is a schematic view of a raster memory.

FIG. 2 and the ensuing drawings illustrate a first embodiment of the present invention, wherein FIG. 2 is a basic block diagram of said embodiment while FIG. 3A is a block diagram of a front half thereof and FIG. 3B is a block diagram of a rear half thereof. FIG. 4 is a detailed block diagram of a circuit for coordinate detection after image rotation or image size variation shown in FIG. 3A, FIG. 5A is a detailed block diagram of an in-area lattice point detection circuit after rotation or size variation shown in FIG. 3B, FIG. 6 is a detailed block diagram of a coordinate inverse conversion circuit shown in FIG. 3B, FIG. 7 is a detailed block diagram of an interpolation circuit shown in FIG. 3B, FIG. 8 is a schematic view of image scanning state, FIG. 9 shows a relation between a page synchronization signal and a sub-scan synchronization signal, FIG. 10 shows a relation between sub-scan synchronization signal and a main-scan synchronization signal, FIG. 11 shows the structure of a raster memory and its relation to scanned data, FIG. 12 shows the mode of interpolation, and FIG. 13 shows a method of obtaining interpolated output image data from scanned input image data after image rotation.

Let the main-scan direction and sub-scan direction of the original image be respectively called the x-axis and the y-axis. Coordinates 1, 2, 3, . . . in the x-direction correspond to the main-scan synchronization signal starting from a sub-scan synchronization signal, and coordinates 1, 2, 3, . . . in y-direction correspond to the sub-scan synchronization signal, starting from a page synchronization signal. Thus a coordinate (x0, y0) corresponds to an x0-th dot in a y0-th raster in the original image (cf. FIGS. 7, 9 and 10).

When a point (x,y) in an orthogonal coordinate system is moved to a point (x', y') by a rotation of an angle $\theta$ about a point $(x_c, y_c)$, there obtain the following relationship:

$$\begin{bmatrix} x' \\ y' \end{bmatrix} = \begin{bmatrix} \cos\theta, & -\sin\theta \\ \sin\theta, & \cos\theta \end{bmatrix} \begin{bmatrix} x - x_c \\ y - y_c \end{bmatrix} + \begin{bmatrix} x_c \\ y_c \end{bmatrix} \quad (1)$$

Also when a point (x', y') is moved to a point (x″, y″) by an independent image size variation of $\alpha$ and $\beta$ times, respectively, in the main-scanning and sub-scanning directions about a center of size variation ($x_z$, $y_z$), there obtain the relationships:

$$\begin{bmatrix} x'' \\ y'' \end{bmatrix} = \begin{bmatrix} \alpha, & 0 \\ 0, & \beta \end{bmatrix} \begin{bmatrix} x' - x_z \\ y' - y_z \end{bmatrix} + \begin{bmatrix} x_z \\ y_z \end{bmatrix} \quad (2)$$

Thus, in the case where a point (x, y) is brought to (x'', y'') by a rotation of an angle $\theta$ about a point ($x_c$, $y_c$) followed by an independent size variation of $\alpha$ and $\beta$ times, respectively, in the main-scanning and sub-scanning directions about a center of size variation ($x_z$, $y_z$), there is obtained an equation:

$$\begin{bmatrix} x'' \\ y'' \end{bmatrix} = \begin{bmatrix} \alpha, & 0 \\ 0, & \beta \end{bmatrix} \left( \begin{bmatrix} \cos\theta, & -\sin\theta \\ \sin\theta, & \cos\theta \end{bmatrix} \begin{bmatrix} x - x_c \\ y - y_c \end{bmatrix} + \begin{bmatrix} x_c \\ y_c \end{bmatrix} - \begin{bmatrix} x_z \\ y_z \end{bmatrix} \right) + \begin{bmatrix} x_z \\ y_z \end{bmatrix} \quad (3)$$

This equation can be transformed into:

$$\begin{bmatrix} x'' \\ y'' \end{bmatrix} = \begin{bmatrix} \alpha\cos\theta, & -\alpha\sin\theta \\ \beta\sin\theta, & -\beta\cos\theta \end{bmatrix} \begin{bmatrix} x \\ y \end{bmatrix} + \begin{bmatrix} \alpha(1-\cos\theta), & \alpha\cos\theta \\ -\beta\sin\theta, & \beta(1-\cos\theta) \end{bmatrix} \begin{bmatrix} x_c \\ y_c \end{bmatrix} + \begin{bmatrix} 1-\alpha, & 0 \\ 0, & 1-\beta \end{bmatrix} \begin{bmatrix} x_z \\ y_z \end{bmatrix} \quad (3)$$

Figure 11B:
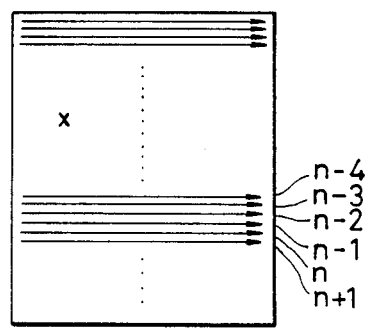
FIGS. 11B and 11C are schematic views showing the relationship of the raster memory of FIG. 11A and scanned data.
Figure 11C:
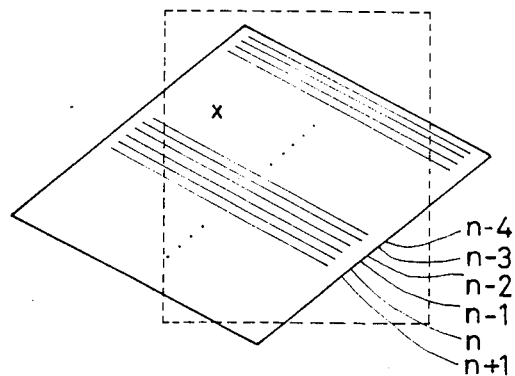
Figure 12:
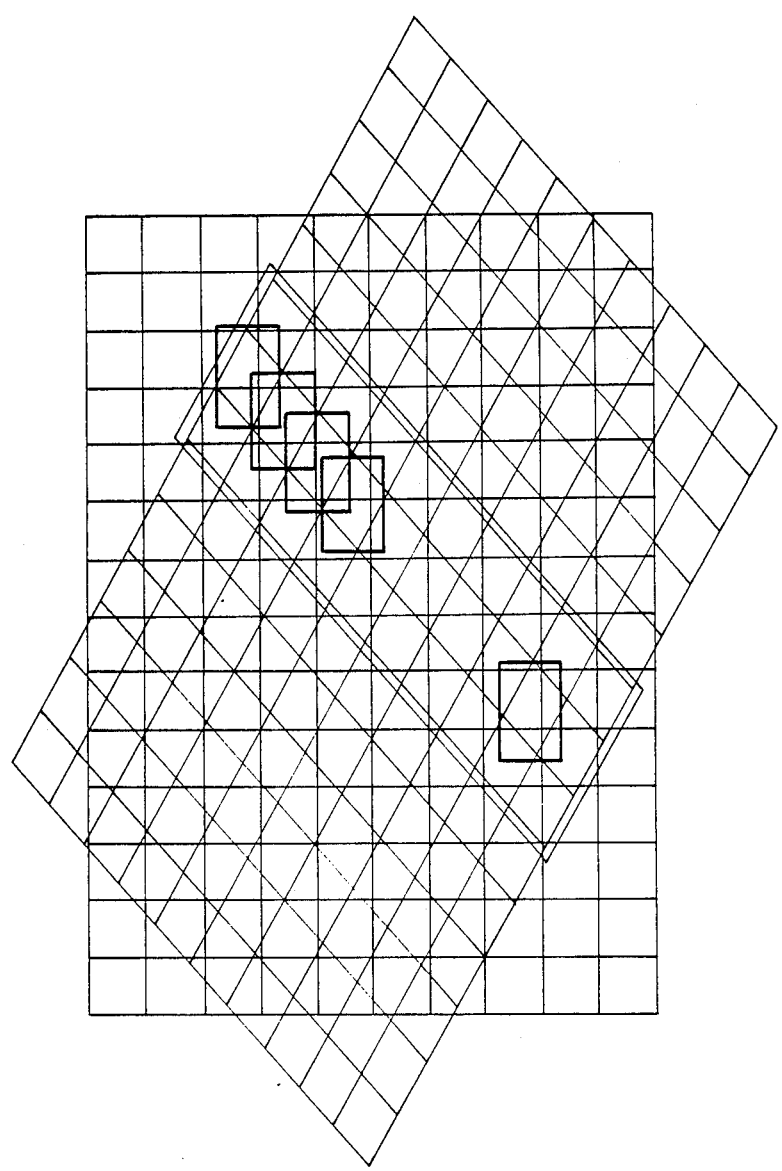
FIG. 12 is a view showing the mode of interpolation.

FIG. 11B shows a scanned input image while FIG. 11C shows an image after rotation and independent image size variation, wherein x indicates the center of rotation and of image size variation.

As $\alpha$ and $\beta$ in equation (3) are generally rational numbers but $\cos\theta$ and $\sin\theta$ are generally irrational numbers, x'' and y'' are generally irrational numbers even when x, y, $x_c$, $y_c$, $x_z$ and $y_z$ are natural numbers. Thus the dots of the image after rotation and independent image size variation are displaced from the dots defined by the input-output synchronization signal.

Figure 13A:
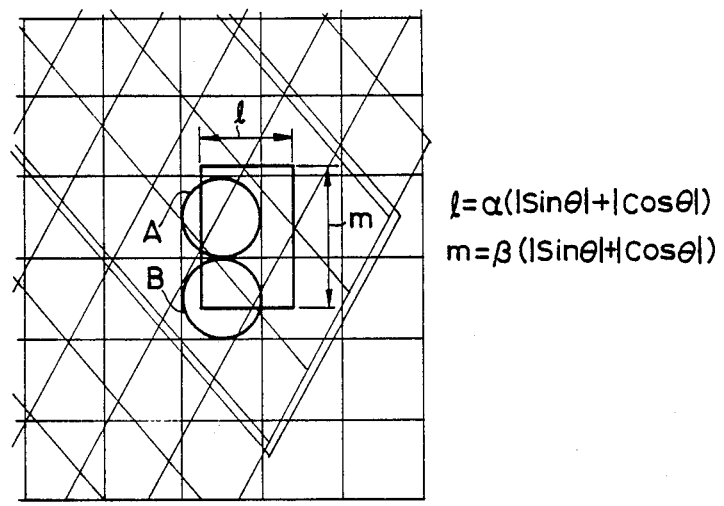
FIGS. 13A, 13B and 13C are views showing a method of obtaining interpolated output image data from scanned input image data subjected to image rotation and image size variation.
Figure 13B:
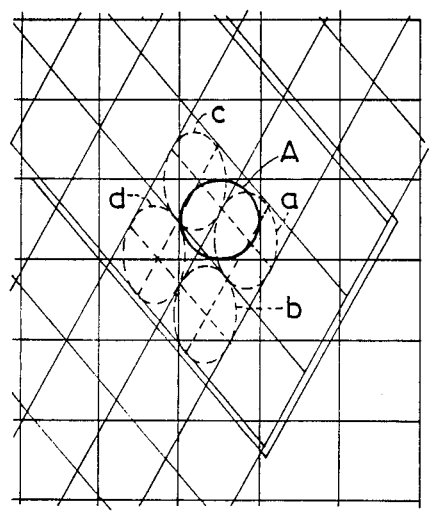

The value of each pixel in the image after rotation and independent image size variation is determined by the data of three consecutive rasters. There is assumed a rectangle of which the center (hereinafter, "center" is used in the sense of "geometric center") is positioned at the center of a contemplated pixel on the second (central) raster and of which the length is defined by $\alpha(|\sin\theta| + |\cos\theta|)$ in the main scanning direction and by $\beta(|\sin\theta| + |\cos\theta|)$ in the sub-scanning direction, and there is detected an output pixel having its center in said rectangle. In FIG. 13A, circles A and B indicate the detected pixels, and the value of each pixel is determined by the four data of rotated rasters surrounding said pixel. FIG. 13B shows the pixel A of which the value is determined by the values of four surrounding pixels a, b, c and d according to a method shown in FIG. 13C. It is assumed that a line segment bd, connecting the centers of pixels b and d, is divided with an interior division ratio of $\delta:1-\delta$ by a line passing through the center of pixel A and parallel to a line segment cd connecting the centers of pixels c and d. Likewise it is assumed that said line segment cd is divided with an interior division ratio of $\epsilon:1-\epsilon$ by a line passing through the center of pixel A and parallel to the line segment bd. The value V(A) of the output pixel A is determined by the values V(a), V(b), V(c) and V(d) of the pixels a, b, c and d according to the following equation:

$$V(A) = (1-\delta)(1-\epsilon)V(a) + (1-\delta)\epsilon V(b) + \delta(1-\epsilon)V(c) + \delta\epsilon V(d) \quad (4)$$

The value V(B) for the pixel B can also be determined in a similar way.

In the following there will be explained the function of the above-explained embodiment.

In response to an instruction for image rotation given by an operator, an operation indication unit 2 shown in FIG. 2 sets information corresponding to the instructed angle of rotation in a process circuit 10. Also, in response to an instruction for image enlargement or reduction, the process circuit 10 is given information corresponding to the proportions of image size variation in the main-scanning and sub-scanning directions.

Then in response to a start instruction from the operator, the operation unit 2 activates a synchronization control unit 6 which executes the required operation by giving synchronization signals to a scan data source 4 and the process circuit 10. The image data are scanned as shown in FIG. 8. The start of image in a page is defined by the down shift of a page synchronization signal, while the start of each scan line in a page is defined by the down shift of a sub-scan synchronization signal, and the fetch timing of each pixel data is defined by the down shift of a main scan synchronization signal (cf. FIGS. 9 and 10).

Now reference is made to FIGS. 3A and 3B for explaining the operations of image rotation and independent image size variation executed by the process circuit 10 shown in FIG. 2. According to the rotation angle $\theta$ instructed by the operator, values of $\sin\theta$, $-\sin\theta$ and $\cos\theta$ are set in a processed coordinate calculating circuit 22 and in a coordinate inverse conversion circuit 28, and values of $|\sin\theta|$ and $|\cos\theta|$ are set in an in-area lattice point detection circuit 24. Also, according to the center of rotation instructed by the operator, values of main-scan offset (rotation) and sub-scan offset (rotation) are set in the processed coordinate calculating circuit 22 and the coordinate inverse conversion circuit 28. Furthermore, according to the proportions of image size variation instructed by the operator, values $\alpha$, $\beta$ of proportions of image size variations in the main-scanning and sub-scanning directions are set in the processed coordinate calculating circuit 22 and the in-area lattice point detection circuit 24, and the corresponding reciprocals $1/\alpha$, $1/\beta$ are set in the coordinate inverse conversion circuit 28. Also, according to the center of image size variation instructed by the operator, values of main-scan offset (image size variation) and sub-scan offset (image size variation) are set in the processed coordinate calculating circuit 22 and the coordinate inverse conversion circuit 28.

In response to the synchronization signal released by the synchronization control unit 6, the scan data source supplies image data in the form of scan data to a raster memory 8 of which the structure is shown in FIG. 11A. It is composed of four line memories 8-1–8-4 corresponding to four scan lines, of which one is used for receiving image data from the scan data source 4 while the other three are used, with already received data, for effecting the processes of rotation, image size variation and interpolation. During the input of scan data for scan line, data are released from one of the scan lines already received.

As shown in FIG. 3, for the scan data already entered, the processed coordinate calculating circuit 22 calculates the coordinates obtained by image rotation and/or image enlargement or reduction of the input coordinates. The in-area lattice point detection circuit 24 detects the lattice points of the output image, present in a rectangle having the its center at the processed coordinate and having lengths $\alpha(|\sin\theta| + |\cos\theta|)$ in the main scanning direction and $\beta(|\sin\theta| + |\cos\theta|)$ in the sub-scanning direction. Based on the thus detected lattice point, the coordinate inverse conversion circuit 28 successively determines the coordinates of said lattice points in a coordinate system after said system itself is subjected to rotation and independent size variation. From said coordinates there are determined input pixels to be employed in the interpolation and the coefficients to be employed in the interpolation, respectively, from the integer part and the fractional part of said coordinates. In this manner the value corresponding to the output lattice point is determined and released.

Now reference is made to FIG. 4 for explaining the processed coordinate calculating circuit 22, for effecting the calculation of the aforementioned equation (1). The circuit functions in response to read-out synchronization signals 4-a, 4-b and 4-c employed in the scan data source 4. In response to the page synchronization signal 4-c, a sub-scan counter 41 is reset and loaded with an initial value "−2", in order that the circuit starts to function with a delay of two scan lines from the scan data source 4. Also, in response to the sub-scan synchronization signal 4-a, a main scan counter 42 is reset and loaded with an initial value "0". The values x, y in said equation (1) are respectively given by the outputs of the main-scan counter 42 and the sub-scan counter 41, and values $x_c$, $y_c$ are respectively given by the main-scan offset (rotation) 43 and sub-scan offset (rotation) 44 defining the coordinate of the center of rotation. Also, according to the rotation angle $\theta$, values of $\sin\theta$, $\cos\theta$ and $-\sin\theta$ are set as constants. By addition, subtraction and multiplication of these data there are obtained the coordinates (x', y') after rotation, in fractional numbers. Then the main-scan offset (size variation) $x_z$ and sub-scan off (size variation) $y_z$ are subtracted respectively from x and y, and the obtained results are respectively multiplied by the proportions $\alpha$, $\beta$ of size varration in main-scanning and sub-scanning directions, and added with $x_z$, $y_z$ to obtain the coordinate x", y" after image rotation and image size variation.

Now the in-area lattice point detection circuit 24 will be explained, with reference to FIG. 5A. This circuit defines a rectangle having its center at the coordinates after processing, and having lateral lengths of $\alpha(|\cos\theta| + |\sin\theta|)$ and $\beta(|\cos\theta| + |\sin\theta|)$ respectively, in the main-scanning and sub-scanning directions, and releases coordinates of lattice points, which are points having integral coordinates both in the main-scanning and sub-scanning directions, present in said rectangle. As the output of coordinate in the main scanning direction, it releases the integer part, after truncation of the fractional part, of a value obtained by adding $\alpha(|\cos\theta| + |\sin\theta|)/2$ to x", and the integer part z, after truncation of fractional part, of a value obtained by subtracting $\alpha(|\cos\theta| + |\sin\theta|)/2$ and adding 1 to x". As output of coordinate in the sub-scanning direction, it releases the integer part, after truncation of the fractional part, of a value obtained by adding $\beta(|\cos\theta| + |\sin\theta|)/2$ to y", and the integer part, after truncation of the fractional part, of a value obtained by subtracting $\beta(|\cos\theta| + |\sin\theta|)/2$ and adding 1 to y". These two sets of integers the are x-coordinates and y-coordinates of the desired lattice points, which are represented by A, B in FIG. 13A.

Coordinates of said lattice points in a coordinate system which is itself subjected to rotation and size variation are determined by a coordinate conversion circuit shown in FIG. 6, which effects an inverse conversion of the process executed by the processed coordinate calculating circuit 22 shown in FIG. 4, through independent size variation by $1/\alpha$ and $1/\beta$, respectively, in the main-scanning and sub-scanning directions and through rotation by $-\theta$.

Figure 13C:
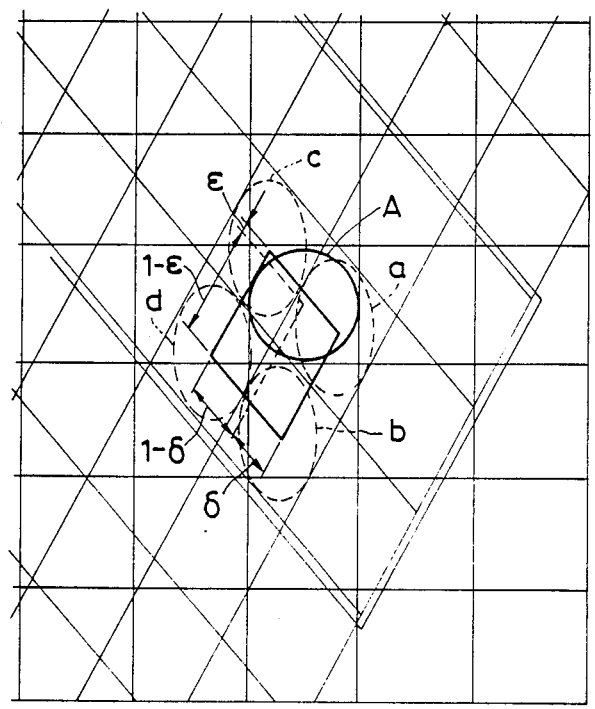

The values of the integer part and integer+1 of thus inversely converted coordinates are used to determine four pixels (a, b, c and d in FIG. 13B) in the raster buffer, and the corresponding fractional parts are used to determine the interpolation coefficients ($\alpha$, $\beta$ in FIG. 13C). Thus an interpolation calculating circuit shown in FIG. 7 executes a calculation according to equation (2) to obtain correction values. The circuit shown in FIG. 7 effects interpolation for all the lattice points present in the aforementioned imaginary rectangle in the processed coordinate system, in response to a main-scan synchronization clock signal.

Figure 5B:
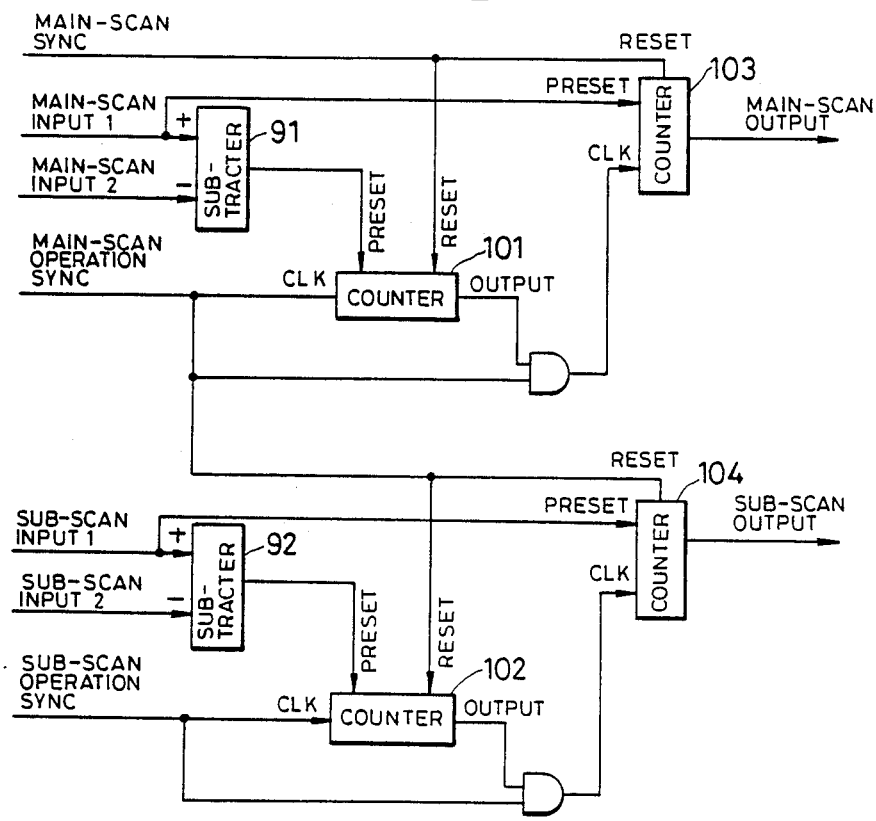
Figure 5C:
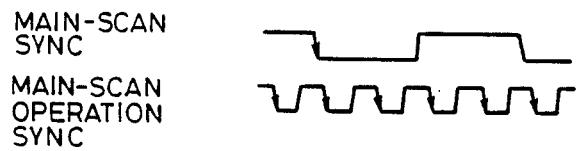
FIG. 5C is a wave form chart showing a main-scan synchronization signal and a main-scan operation synchronization signal.
Figure 5D:
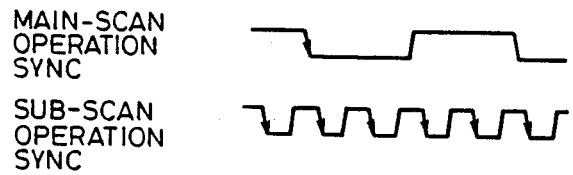
FIG. 5D is a wave form chart showing the main-scan operation synchronization signal and a sub-scan operation synchronization signal.

Based on the maximum and minimum coordinates in the main-scan direction (main-scan outputs 1 and 2) and maximum and minimum coordinates in the sub-scan direction (sub-scan outputs 1 and 2) of the lattice points present in said rectangular area, the circuit shown in FIG. 5B releases the main-scan and sub-scan coordinates of all the lattice points present in said area, in synchronization with a main-scan operation synchronization clock signal which is faster than the main-scan synchronization signal and with a sub-scan operation synchronization clock signal which is faster than said main-scan operation synchronization signal. In comparison with the main-scan synchronization signal, the main-scan operation synchronization signal is faster at least by a factor of (integer part of proportion of size variation $\times \sqrt{2} + 1$). In the present embodiment it is 4 times faster (cf. FIG. 5C). Also in comparison with the main-scan operation synchronization signal, the sub-scan operation synchronization signal is faster at least by a factor of (integer part of proportion of size variation $\times \sqrt{2} + 1$) (cf. FIG. 5D). In the present embodiment, wherein said proportion is 1.6 times, the latter should be faster by $[1.6 \times \sqrt{2}] + 1 = 3$ times. One-shot down counters 101, 102 shown in FIG. 5B release high-level signals during a counting operation, and release low-level signals when the count reaches zero. There are further provided down counters 103, 104 in FIG. 5B. The interpolation process circuit shown in FIG. 7 executes the calculation of equation (2) by at first obtaining:

$$\delta\{V(c) - V(a)\} + V(a) = (1-\delta)V(a) + \delta V(c) = V1$$

and $$\delta\{V(d)-V(b)\}+V(b)=(1-\delta)V(b)+\delta V(d)=V2$$

and then calculating $$\epsilon(V2 - V1) + V1 = (1 - \epsilon)V1 + \epsilon V2 =$$
$$(1 - \delta)(1 - \epsilon)V(a) + (1 - \delta)\epsilon V(b) + \delta(1 - \epsilon)V(c) +$$
$$\delta\epsilon V(d) = V(D).$$

Figure 14:
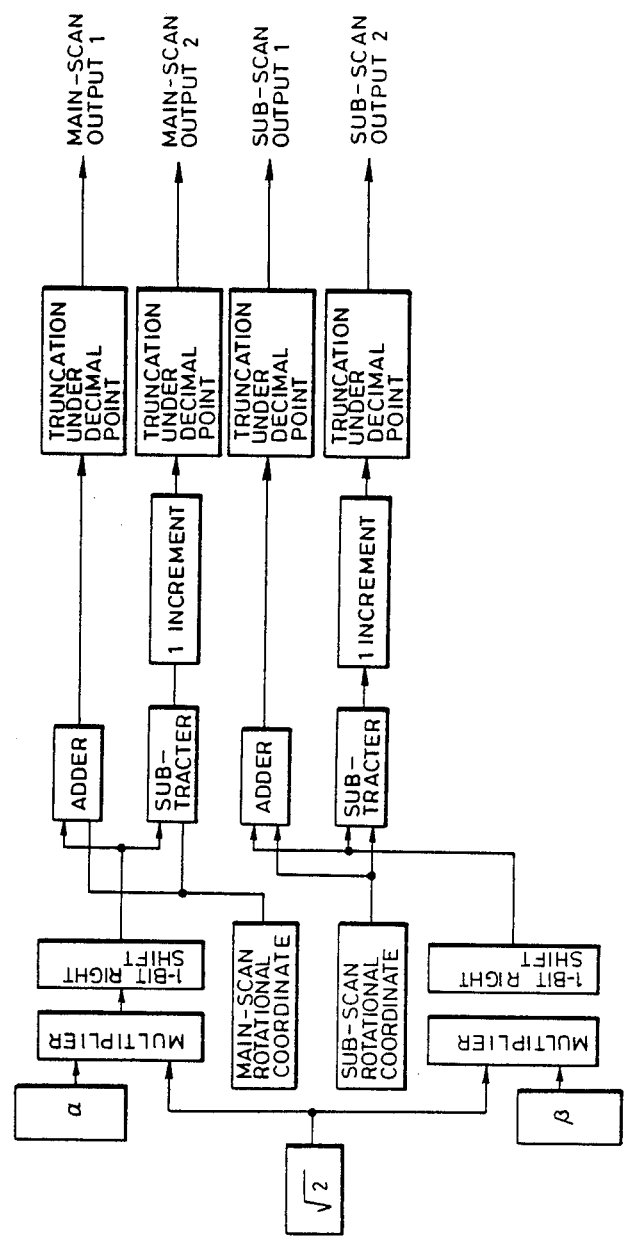
FIG. 14 is a block diagram showing a variation of the circuit shown in FIG. 5A.

The lattice point detection circuit 24 shown in FIG. 5A determines the lengths of the rectangle by the values $|\sin \theta|$ and $|\cos \theta|$ determined according to the rotation angle $\theta$, but there may also be employed a constant $K=\sqrt{2}$ of the rotation angle $\theta$, as shown in FIG. 14. In this case it is rendered possible to dispense with the setting of said values and therefore to reduce the magnitude of circuit. In this case the sides of the rectangle are $\alpha\sqrt{2}$ and $\beta\sqrt{2}$ respectively in the main-scanning and sub-scanning directions.

In the foregoing there has been explained an embodiment of an image rotation combined with an image size variation of $\alpha$ times and $\beta$ times, respectively, in the main-scanning and sub-scanning directions.

In the following there will be explained a variation in which the image is rotated in the same size.

Figure 15A:
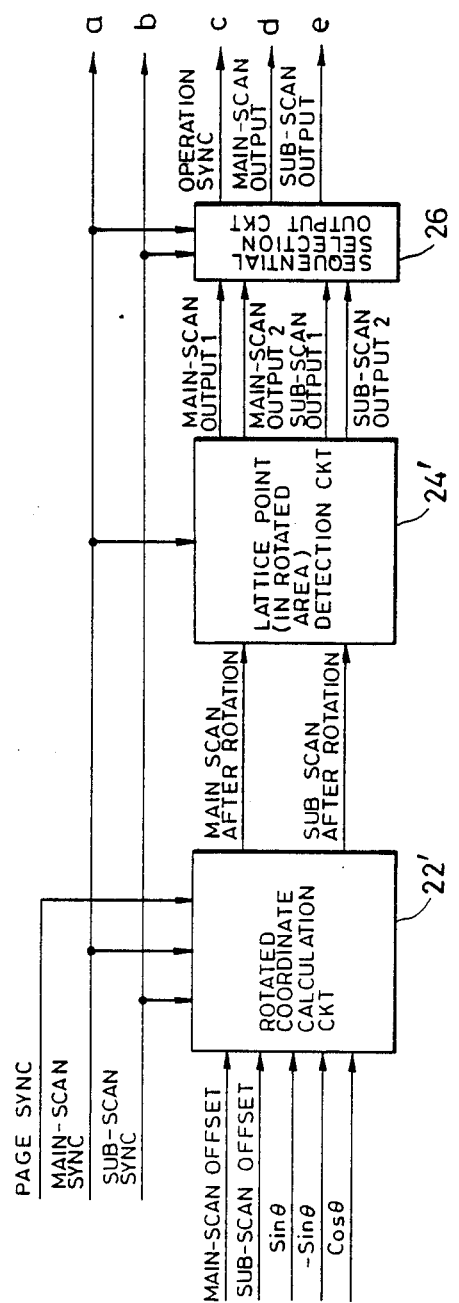
FIGS. 15A and 15B are block diagrams showing a variation of the first embodiment.
Figure 15B:
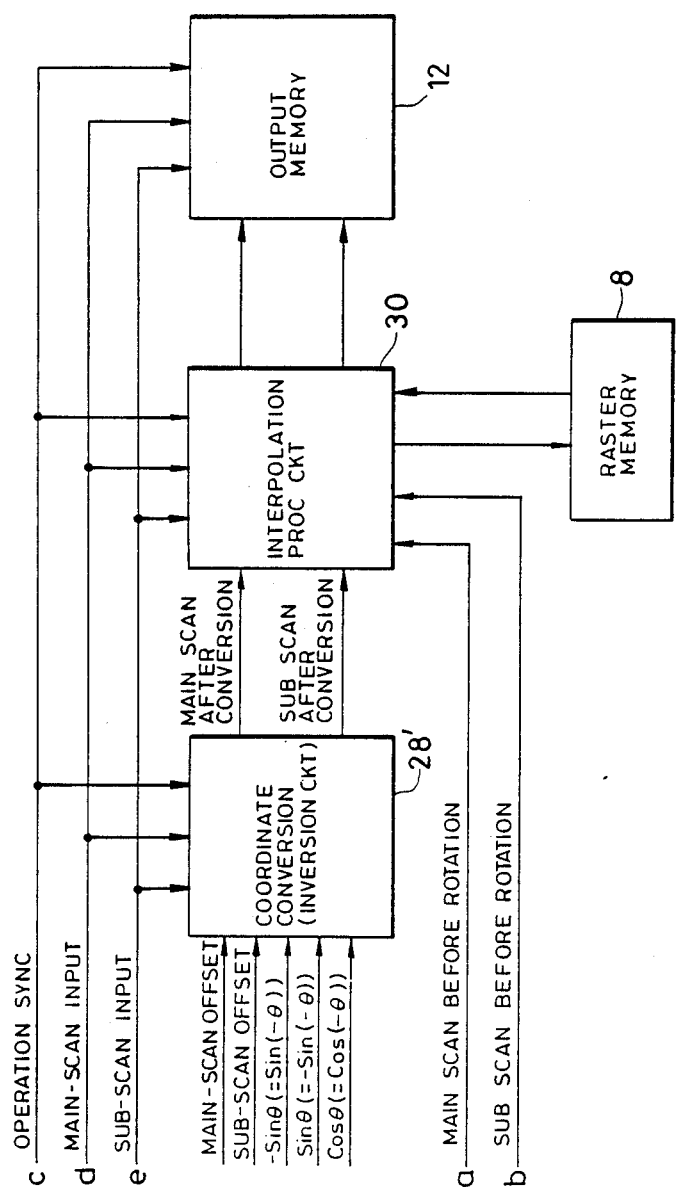

Said variation is schematically shown in FIGS. 15A and 15B, wherein components of equivalent functions as those in FIGS. 3A and 3B are represented by the same numbers or symbols.

Figure 16:
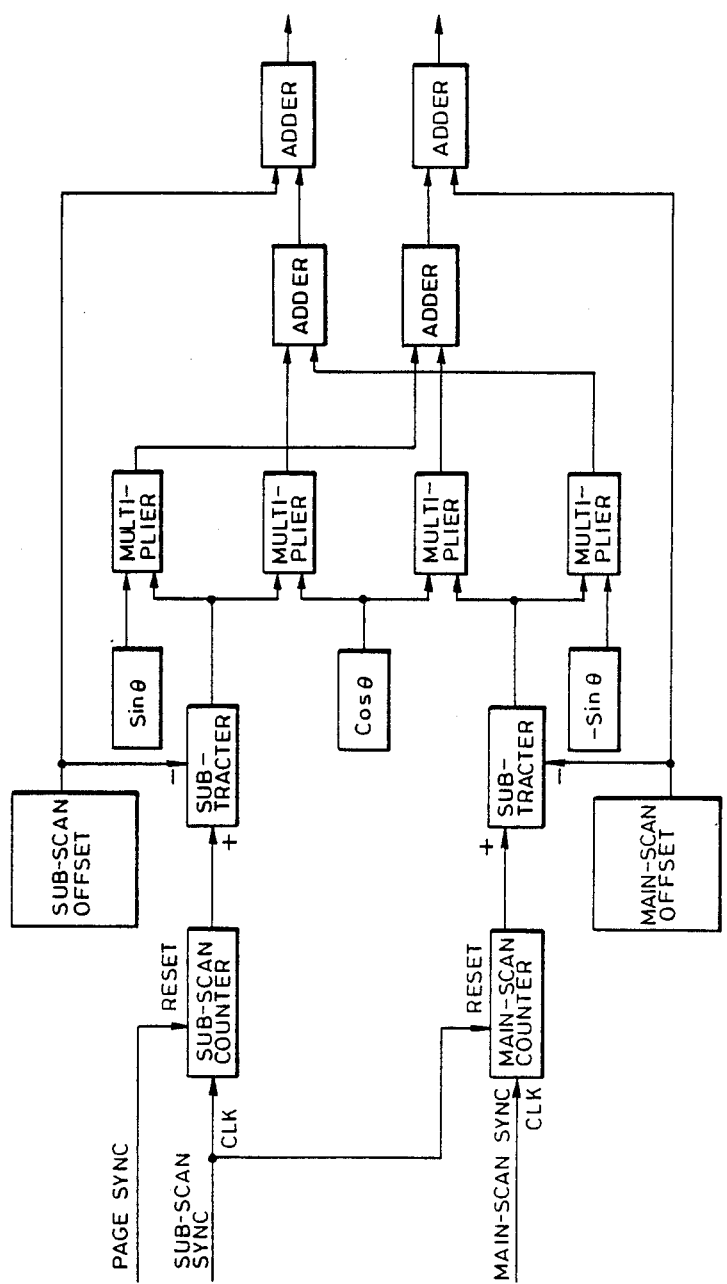
FIG. 16 is a block diagram of a circuit 22' for calculating coordinates after rotation, shown in FIG. 15A.
Figure 17:
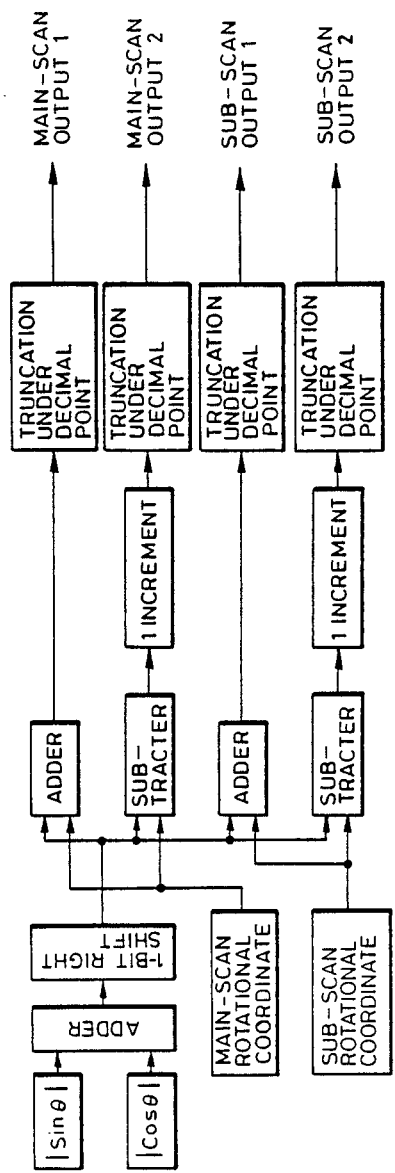
FIG. 17 is a detailed block diagram of a lattice point calculating circuit 24' shown in FIG. 15A.
Figure 18:
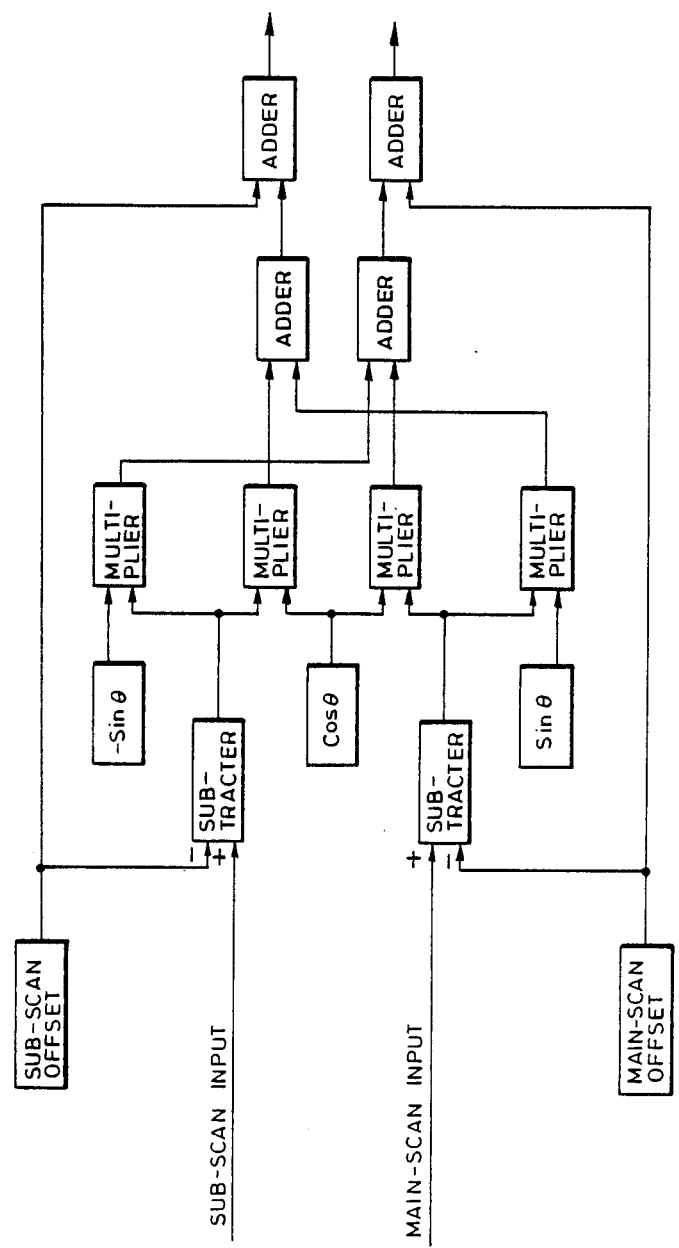
FIG. 18 is a detailed block diagram of a coordinate inverse conversion circuit 28' shown in FIG. 15B.
Figure 19A:
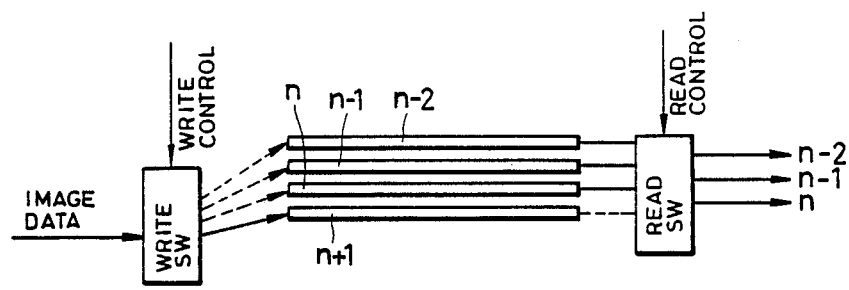
FIGS. 19A, 19B and 19C are schematic views showing the relationship between the raster memory and scanned data.
Figure 19B:
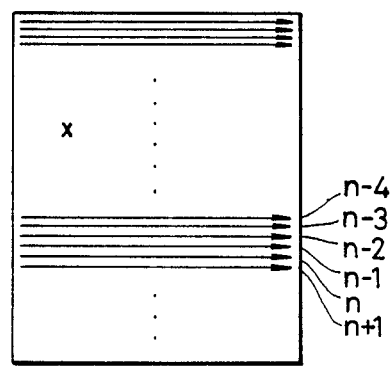
Figure 19C:
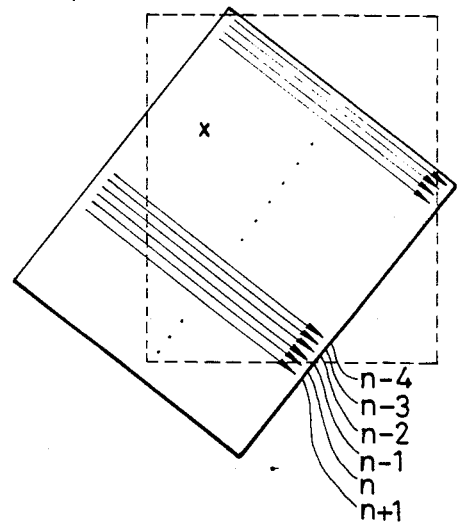
Figure 20A:
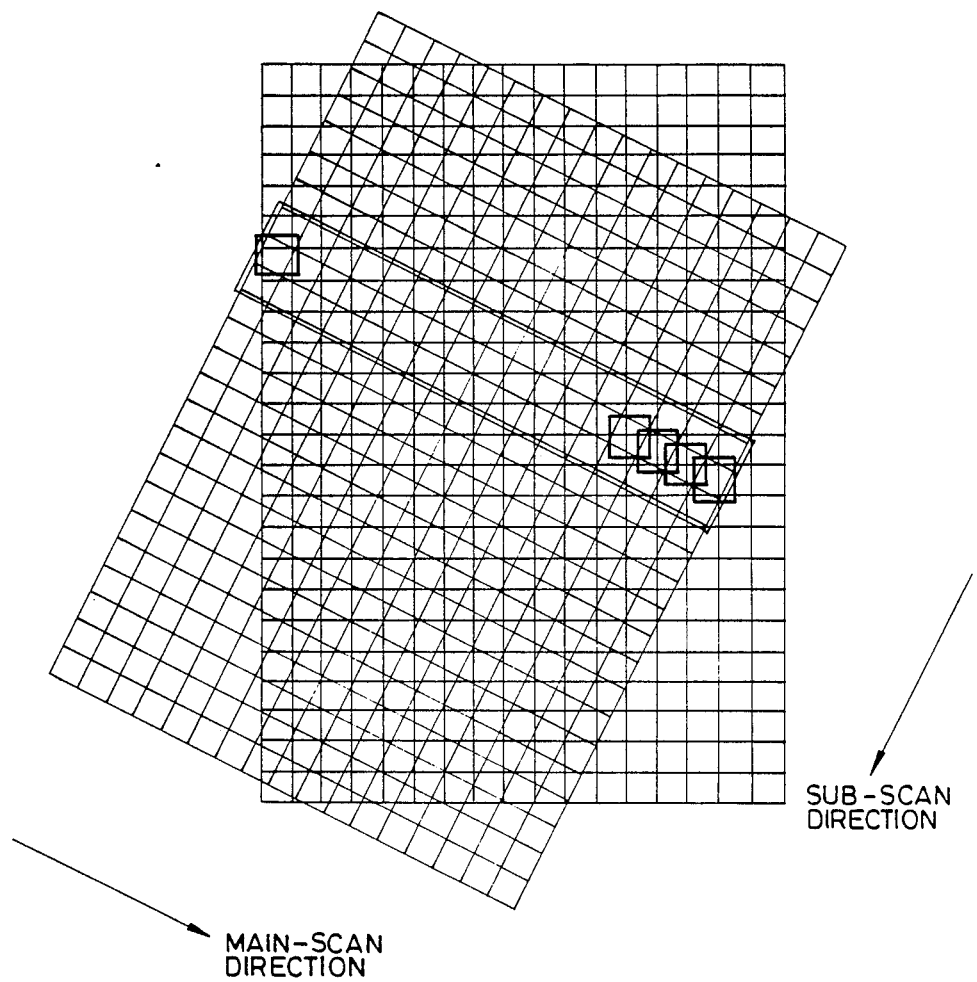
FIGS. 20A and 20B are schematic views showing the mode of interpolation.
Figure 20B:
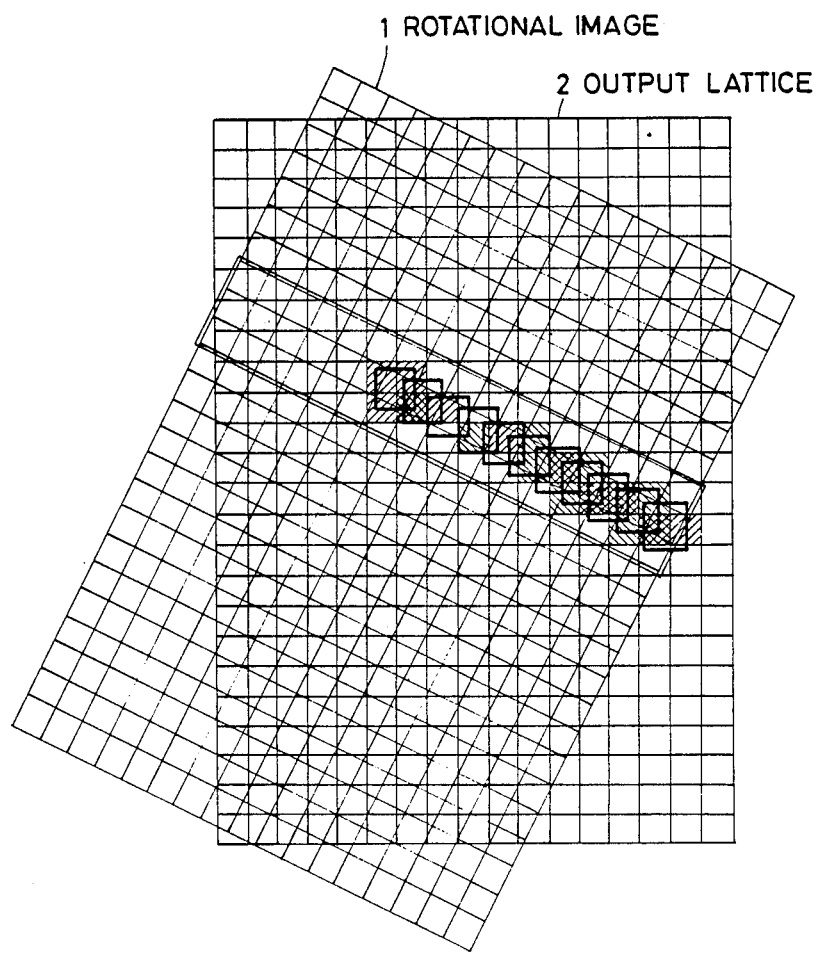
Figure 21A:
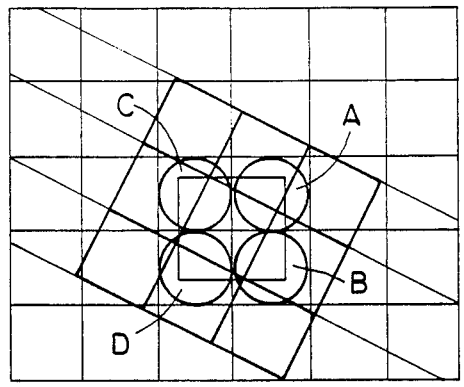
FIGS. 21A, 21B and 21C are schematic views showing a method of obtaining interpolated output image data from scanned input image data subjected to image rotation.
Figure 21B:
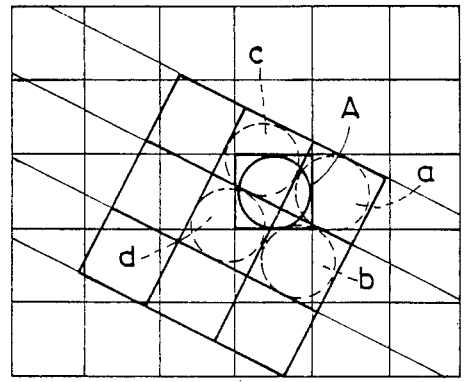
Figure 21C:
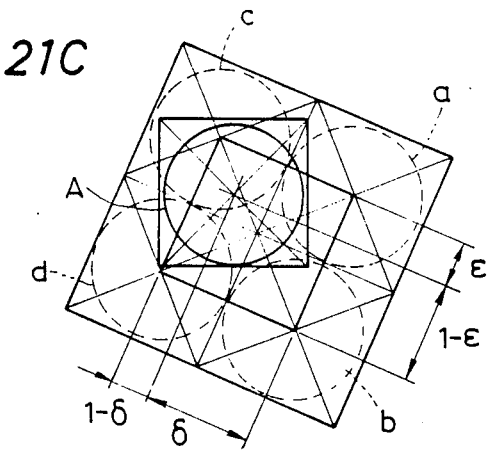

FIG. 16 is a detailed block diagram of a rotated coordinate calculating circuit 22' shown in FIG. 15A. FIG. 17 is a detailed block diagram of an in-area lattice point calculating circuit 24' shown in FIG. 15A, and FIG. 18 is a detailed block diagram of a coordinate inverse conversion circuit 28' shown in FIG. 15B. These circuits are simpler than those shown in FIGS. 4, 5A, 5B and 6, due to the absence of the size variation process. FIGS. 19A to 19C show the structure of a raster memory and its relation to the scan data, while FIGS. 20A and 20B show the mode of interpolation, and FIGS. 21A to 21C illustrate a method of obtaining interpolated output image data.

Let the main-scan direction and sub-scan direction of the original image be respectively called the x-axis and the y-axis. Coordinates 1, 2, 3, ... in x-direction correspond to the main-scan synchronization signal starting from a sub-scan synchronization signal, and coordinates 1, 2, 3, ... in the y-direction correspond to the sub-scan synchronization signal, starting from a page synchronization signal. Thus coordinates (x0, y0) corresponds to an x0-th dot in a y0-th raster in the original image (cf. FIGS. 7, 9 and 10).

When a point (x, y) in an orthogonal coordinate system is moved to a point (x', y') by a rotation of an angle $\theta$ about a point $(x_c, y_c)$, there obtains the relationship:

$$\begin{pmatrix} x' \\ y' \end{pmatrix} = \begin{pmatrix} \cos\theta, & -\sin\theta \\ \sin\theta, & \cos\theta \end{pmatrix} \begin{pmatrix} x - x_c \\ y - y_c \end{pmatrix} + \begin{pmatrix} x_c \\ y_c \end{pmatrix} \quad (1)$$

The relation between an input scan image and a rotated scan image is shown in FIGS. 19B and 19C, respectively indicating an original image and a rotated image, wherein a mark x indicates the center of rotation.

Since $\cos \theta$ and $\sin \theta$ in the equation (1) are generally irrational numbers, x' and y' are also irrational even if x, y, $x_c$ are natural numbers. Thus the dots of the image after rotation are displaced from the dots defined by the input-output synchronization signal.

The value of each pixel in the image after rotation is determined by the data of three consecutive rasters. There is assumed a square of which center is positioned at the center of a contemplated pixel on the second (central) raster and of which size is defined by $|\sin \theta| + |\cos \theta|$, and there are detected output pixels having their centers in said square. In FIG. 21A, circles A, B, C and D indicate the detected pixels, and the value of each pixel is determined by the four data of rotated rasters surrounding said pixel. FIG. 21B shows the pixel A of which value is determined by the values of four surrounding pixels a, b, c and d according to a method shown in FIG. 21C. It is assumed that line segment ac, connecting the centers of pixels a and c, is divided with an interior division ratio of $\epsilon:1-\epsilon$ by a perpendicular line passing through the center of pixel A. Likewise it is assumed that a line segment ab, connecting the centers of pixels a and b, is divided with an interior division ratio of $\delta:1-\delta$ by a perpendicular line passing through the center of pixel A. The value V(A) of the pixel A is determined by the values V(a), V(b), V(c) and V(d) of the pixels a, b, c and d according to the following equation:

$$V(A)=(1-\delta)(1-\epsilon)V(a)+(1-\delta)\epsilon V(b)+\delta(1-\epsilon)V(c)+\delta\epsilon V(d) \quad (2)$$

The values V(B), V(C), V(D) for the pixels B, C, D can also be determined in a similar way.

In the following there will be explained the function of the above-explained embodiment.

In a similar manner as in the first embodiment, in response to an instruction for image rotation given by an operator, an operation indication unit sets information corresponding to the instructed angle of rotation in a process circuit. Then, in response to a start instruction from the operator, the operation unit activates a synchronization control unit which executes required operation by giving synchronization signals to a scan data source and the process circuit (cf. FIG. 2).

The image data are scanned as shown in FIG. 8. The start of image in a page is defined by the down shift of a page synchronization signal, while the start of each scan line in a page is defined by the down shift of a sub-scan synchronization signal, and the fetch timing of each pixel data is defined by the down shift of a main scan synchronization signal (cf. FIGS. 9 and 10).

In the following there will be explained the operation of image rotation and interpolation. According to the rotation angle $\theta$ instructed by the operator, values of $\sin \theta$, $-\sin \theta$ and $\cos \theta$ are set in a rotated coordinate calculating circuit 22' and in a coordinate inverse conversion circuit 28', and values of $|\sin \theta|$ and $|\cos \theta|$ are set in an in-area lattice point detection circuit, through an unrepresented CPU. Also, according to the center of rotation instructed by the operator, values of main-scan offset and sub-scan offset are set in the rotated coordinate calculating circuit 22' and the coordinate inverse conversion circuit 28', again through the unrepresented CPU.

In response to the synchronization signal released by the synchronization control unit, the scan data source supplies image data in the form of scan data to a raster memory, of which structure is shown in FIG. 19A. It is composed of four line memories corresponding to four scan lines, of which one is used for receiving image data from the scan data source while other three are used, with already received data for effecting the processes of rotation and interpolation. During the input of scan data for a scan line, data are released from one of the scan lines already received.

As shown in FIG. 15, for the scan data already entered, the rotated coordinate calculating circuit calculates the coordinates obtained by image rotation of the input coordinates. The in-area lattice point detection circuit 24' detects the lattice points of the output image, present in a square having the center at the rotated coordinate and having a size of $|\sin \theta| + |\cos \theta|$. Based on thus detected lattice points, the coordinate inverse conversion circuit 28' successively determines the coordinates of said lattice points in a coordinate system after said system itself is subjected to rotation. From said coordinates there are determined input pixels to the employed in the interpolation and the coefficients to be employed in the interpolation, respectively from the integer part and the fractional part of the values of said coordinates. In this manner the value corresponding to the output lattice point is determined and released.

Now reference is made to FIG. 16 for explaining the rotated coordinate calculating circuit 22, for effecting the calculation of the aforementioned equation (1). The circuit functions in response to synchronization signals employed in the scan data source. In response to the page synchronization signal, a sub-scan counter is reset and loaded with an initial value "−2", in order that the circuit starts to function with a delay of two scan lines from the scan data source. Also in response to the sub-scan synchronization signal, a main scan counter is reset and is loaded with an initial value "0". The values x, y in said equation (1) are respectively given by the outputs of the main-scan counter and sub-scan counter, and values $x_c$, $y_c$ are respectively given by the main-scan offset and sub-scan offset defining the coordinate of the center of rotation. Also according to the rotation angle $\theta$, values $\sin \theta$, $\cos \theta$ and $-\sin \theta$ are set as constants. By addition, subtraction and multiplication of these data there is obtained the coordinate (x', y') after rotation, in fractional numbers.

In the following the in-area lattice point detection circuit will be explained, with reference to FIG. 17. It defines a square having the center at the coordinate after rotation, and having a side of $|\cos \theta| + |\sin \theta|$ and releases coordinates of lattice points, which are points having integer coordinate both in the main-scanning and sub-scanning directions, present in said square (cf. square in FIG. 21A). As coordinate output, it releases the integer parts, after truncation of fractional parts, of values obtained by adding $(|\cos \theta| + |\sin \theta|)/2$ respectively to x' and y', and the integer parts, after truncation of fractional parts, of values obtained by subtracting $(|\sin \theta| + |\cos \theta|)/2$ and adding 1 to x' and y' (cf. A, B, C and D in FIG. 21A).

Integer coordinates of said lattice points in a coordinate system which is itself subjected to rotation are determined by a cordinate conversion circuit shown in FIG. 18, which effects an inverse conversion (rotation of $-\theta$) of the process of calculating coordinates after rotation shown in FIG. 16.

The values of the integer part and the integer part plus one of the thus inversely converted coordinates in the main-scanning and sub-scanning directions are used to determined four pixels (a, b, c and d in FIG. 21B) in the raster buffer, and the corresponding fractional parts are used to determine the interpolation coefficients ($\alpha$, $\beta$ in FIG. 21C). Thus an interpolation calculating circuit shown in FIG. 7 executes a calculation according to the equation (2) to obtain correction values. The circuit shown in FIG. 7 successively releases correction values for four lattice points (which can eventually be a same point), in response to a main-scan synchronization clock signal.

FIG. 20 shows the movement of scan point by the main-scan clock. Interpolations for 4 pixels are conducted for each main-scan synchronization signal However, the main-scan outputs 1 and 2, released from the in-area lattice point detection circuit shown in FIGS. 15A or 17 may eventually become equal, and the sub-scan outputs 1 and 2 may also become equal. In the case where they are all different, the interpolation is conducted for different four pixels. On the other hand, if the outputs in the main or sub-scanning direction are the same, the interpolation is conducted for four pixels which are mutually the same in pairs. Also if said outputs are same both in the main and sub-scanning directions, the interpolation is conducted for the 4 same pixels. These cases correspond respectively to the presence of 4, 2 or 1 output pixel in the square shown in FIG. 20B. The calculation conducted by the interpolation process circuit is the same as explained in the first embodiment.

In the foregoing there has been explained a case of image rotation in the same size. In the following there will be explained a second variation for an image rotation combined with an image size variation in a same proportion in the main and sub-scanning directions.

Figure 22A:
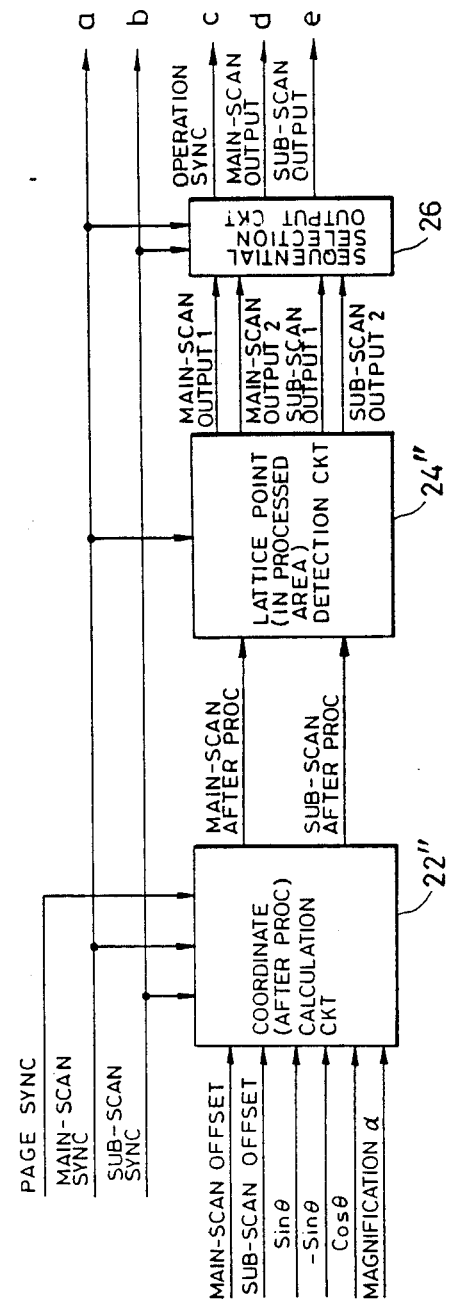

This variation is schematically shown in FIGS. 22A and 22B, wherein components of same functions as those in FIGS. 3A and 3B are represented by same numbers or symbols.

Figure 23:
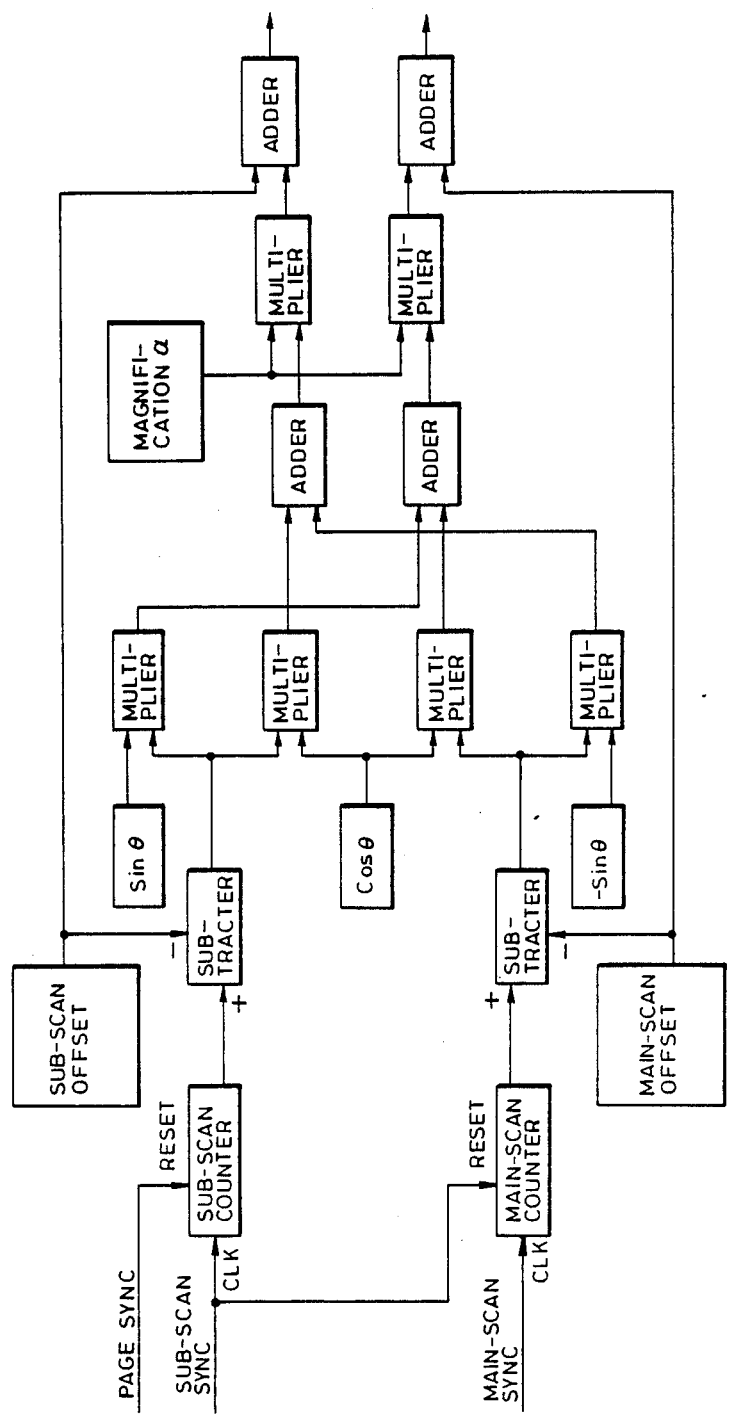
FIG. 23 is a detailed block diagram of a coordinate calculating circuit 22″ shown in FIG. 22A.
Figure 24A:
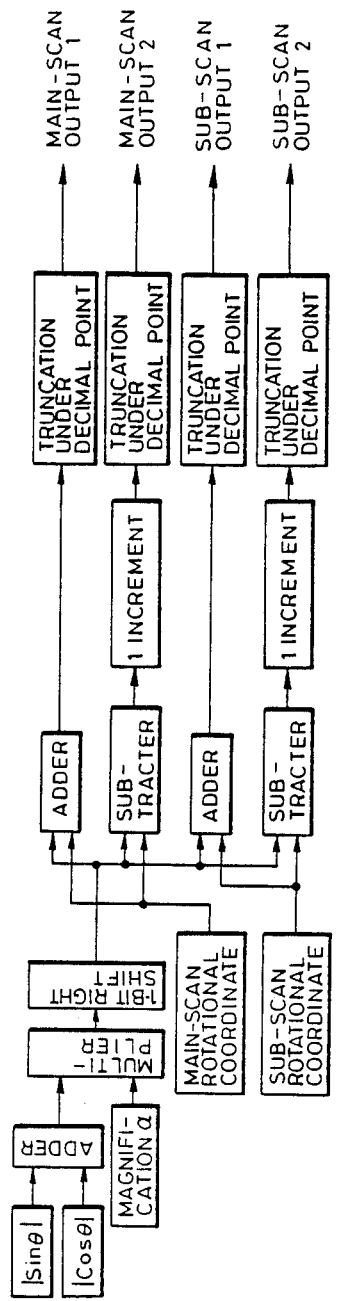
FIGS. 24A and 24B are detailed block diagrams of a lattice point calculating circuit 24″ shown in FIG. 22A.
Figure 24B:
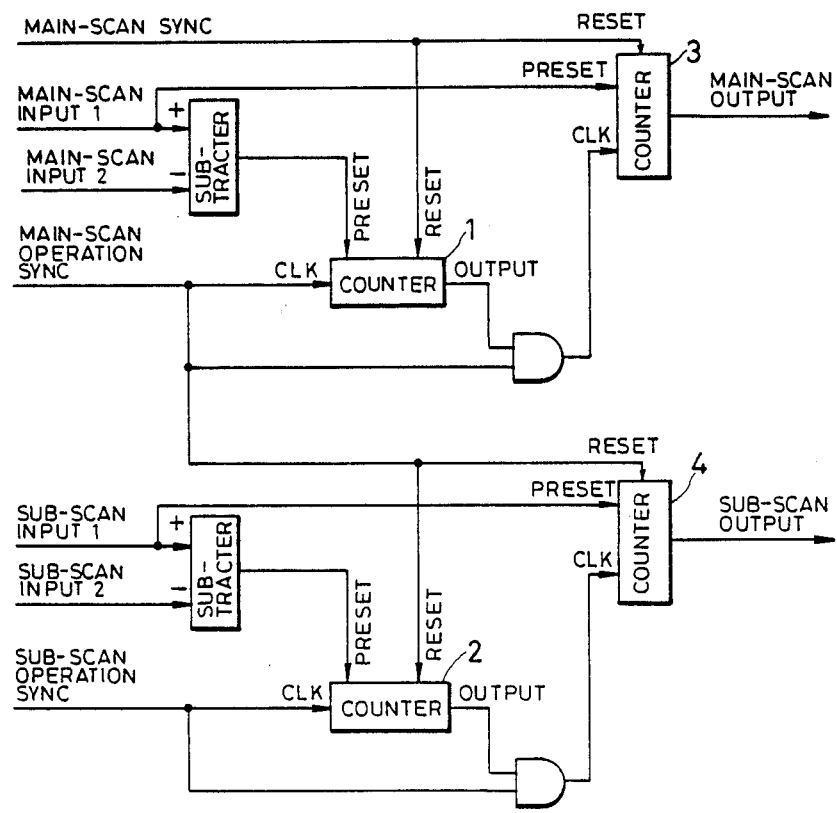
Figure 25:
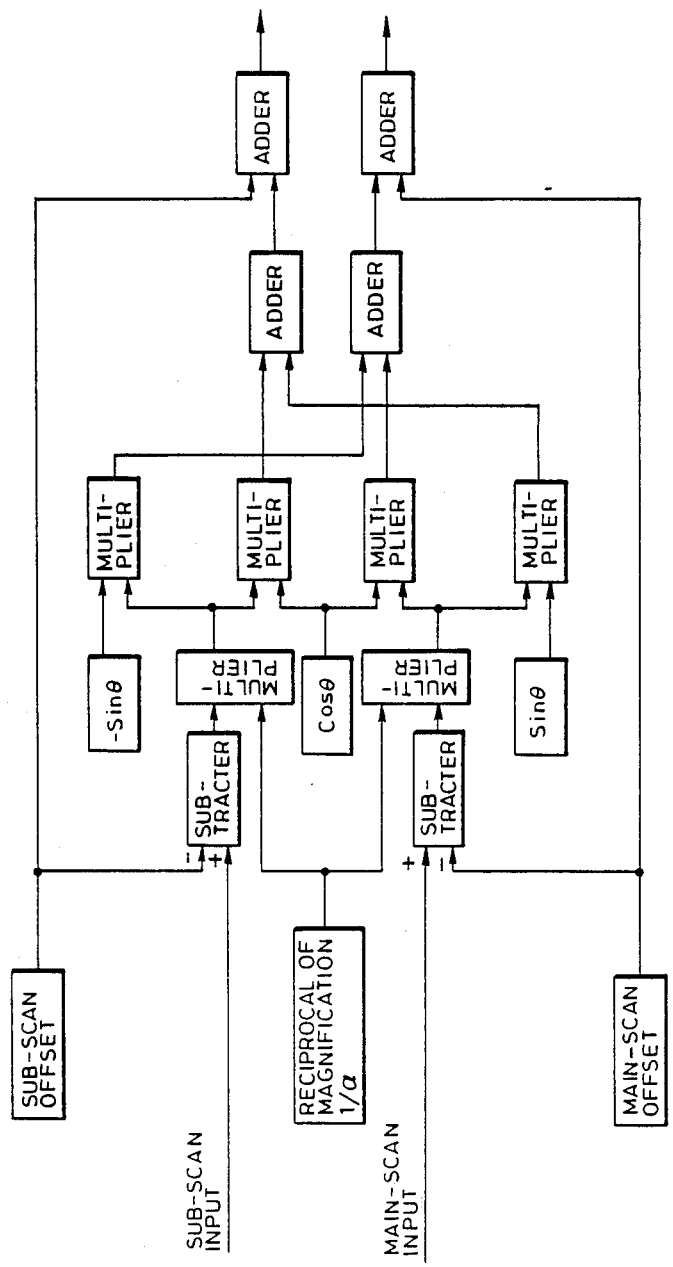
FIG. 25 is a detailed block diagram of a coordinate conversion circuit 28″ shown in FIG. 22B.

FIG. 23 is a detailed block diagram of a rotated coordinate calculating circuit 22" shown in FIG. 22A, and FIGS. 24A and 24B are detailed block diagrams of an in-area lattice point detection circuit 24". Also FIG. 25 is a detailed block diagram of a coordinate inverse conversion circuit 28" shown in FIG. 22B.

In the following there will be explained the function of the above-mentioned variation.

In response to an instruction for image rotation given by an operator, an operation indication unit sets information corresponding to the instructed angle of rotation in a process circuit. Also in response to an instruction for image enlargement or reduction, the process circuit is given information corresponding to the proportion of image size variation. Then in response to a start instruction from the operator, the operation unit activates a synchronization control unit which executes required operation by giving synchronization signals to a scan data source and the process circuit (cf. FIG. 2).

The image data are scanned as shown in FIG. 8. The start of image in a page is defined by the down shift of a page synchronization signal, while the start of each scan line in a page is defined by the down shift of a sub-scan synchronization signal, and the fetch timing of each pixel data is defined by the down shift of main scan synchronization signal (cf. FIGS. 9 and 10).

In the following there will be explained the operations of image rotation, enlargement, reduction and interpolation. According to the rotation angle $\theta$ instructed by the operator, values of $\sin \theta$, $-\sin \theta$ and $\cos \theta$ are set in a processed coordinate calculating circuit and in a coordinate inverse conversion circuit, and values of $|\sin \theta|$ and $|\cos \theta|$ are set in an in-area lattice point detection circuit, both by means of an unrepresented CPU. Also according to the center of rotation instructed by the operator, values of main-scan offset and sub-scan offset are set in the processed coordinate calculating circuit and the coordinate inverse conversion circuit. Furthermore, the proportion $\alpha$ of image size variation is set in the processed coordinate calculating circuit and the in-area lattice point detection circuit, and the corresponding reciprocal $1/\alpha$ is set in the coordinate inverse conversion circuit.

In response to the synchronization signal released by the synchronization control unit, the scan data source supplies image data in the form of scan data to a raster memory, of which the structure is shown in FIG. 11A. It is composed of four line memories corresponding to four scan lines, of which one is used for receiving image data from the scan data source, while other three are used, with already received data, for effecting the processes of rotation, enlargement, reduction and interpolation. During the input of scan data for a scan line, data are released from one of the scan lines already received.

As shown in FIG. 22, for the scan data already entered, the processed coordinate calculating circuit calculates the coordinates obtained by image rotation and image enlargement or reduction of the input coordinates. The in-area lattice point detection circuit detects the lattice points of the output image, present in a square having the center at the processed coordinate and having a side of $\alpha(|\sin\theta| + |\cos\theta|)$. Based on thus detecte lattice points, the coordinate inverse conversion circuit successively determines the coordinates of said lattice points in a coordinate system after said system itself is subjected to enlargement or reduction and rotation. From said coordinates there are determined input pixels to be employed in the interpolation and the coefficients to be employed in the interpolation, respectively from the integer part and the fractional part of said coordinates. In this manner the value corresponding to the output lattice point in determined and released.

Now reference is made to FIG. 23 for explaining the processed coordinate calculating circuit for effecting the calculation of the aforementioned equation (1). The circuit functions in response to the synchronization signals employed in the scan data source. In response to the page synchronization signal, a sub-scan counter is reset and loaded with an initial value "−2", in order that the circuit starts to function with a delay of two scan lines from the scan data source. Also in response to the sub-scan synchronization signal, a main scan counter is reset and loaded with an initial value "0". The values x, y in said equation (1) are respectively given by the outputs of the main-scan counter and the sub-scan counter, and values $x_c$, $y_c$ are respectively given by the main-scan offset and sub-scan offset difining the coordinate of the center of rotation. Also according to the rotation angle $\theta$, values of $\sin\theta$, $\cos\theta$ and $-\sin\theta$ are set, and the proportion of image size variation is also set. By addition, subtraction and multiplication of these data there are obtained the coordinates (x', y') after rotation, in fractional numbers.

Figure 26A:
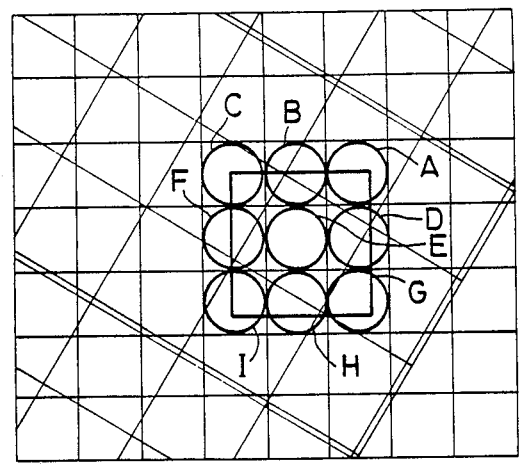
FIGS. 26A, 26B and 26C are schematic views showing a method of obtaining interpolated output image data from scanned input image data subjected to image rotation or image size variation according to said second variation.

Now the in-area lattice point detection circuit will be explained, with reference to FIG. 24A. It defines a square having the center at the coordinate after processing, and having a side of $\alpha(|\cos\theta| + |\sin\theta|)$, and releases main and sub-scanning coordinates of lattice points, which are points having integer coordinates both in the main and sub-scanning directions, present in said square (cf. square in FIG. 26A). As the outputs it releases the integer parts, after truncation of fractional parts, of values obtained by adding $\alpha(|\cos\theta| + |\sin\theta|)/2$ respectively to x' and y', and other integer parts, after truncation of fractional parts, of values obtained by subtracting $\alpha(|\cos\theta| + |\sin\theta|)/2$ and adding 1 to x' and y' (cf. A, B, C, D, E, F, G, H and I in FIG. 26A).

Integer coordinates of said lattice points in a coordinate system which is itself subjected to rotation are determined by a coordinate conversion circuit shown in FIG. 25, which effects an inverse conversion (rotation of $-\theta$) of the process of calculating coordinates after processing.

Figure 26B:
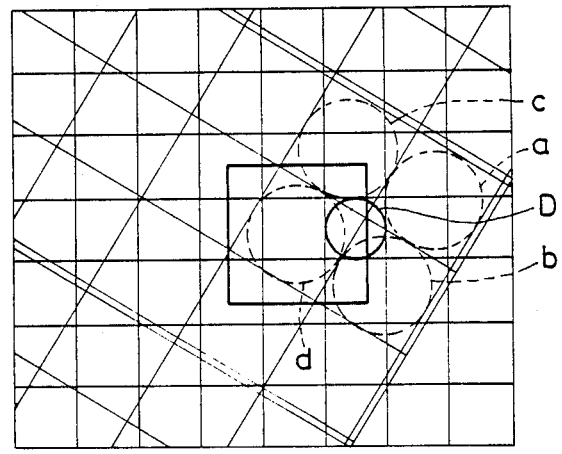
Figure 26C:
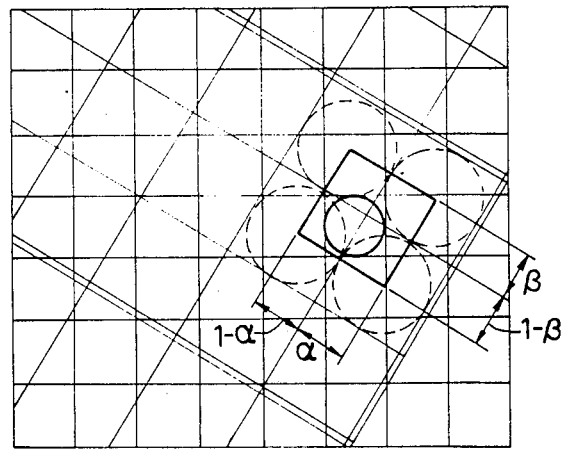
Figure 27:
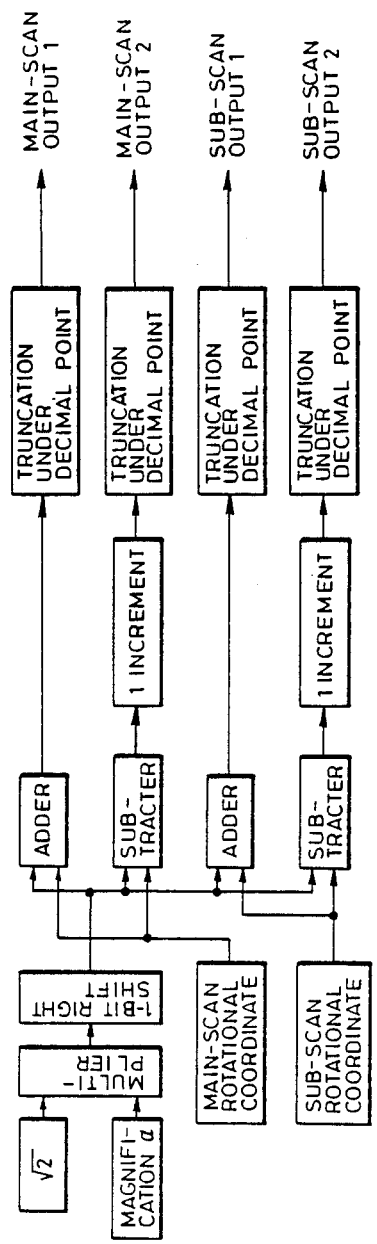
FIG. 27 is a block diagram of a variation of the circuit shown in FIG. 24A.

The values of integer part and integer part plus one of thus inversely converted coordinates are used to determine four pixels (a, b, c and d in FIG. 26B) in the raster buffer, and corresponding fractional parts are used to determine the interpolation coefficients ($\alpha$, $\beta$ in FIG. 26C). Thus an interpolation calculating circuit shown in FIG. 7 executes a calculation according to the equation (2) to obtain correction values in the same manner as in the first embodiment. The circuit shown in FIG. 7 effects interpolation for all the lattice points present in the aforementioned imaginary square in the processed coordinate system, in response to each main-scan synchronization clock signal.

Based on the maximum and minimum coordinates in the main-scan direction (main-scan outputs 1 and 2) and maximum and minimum coordinates in the sub-scan direction (sub-scan outputs 1 and 2) of the lattice points present in said square area, the circuit shown in FIG. 24B releases the main-scan and sub-scan coordinates of all the lattice points present in said area, in synchronization with a main-scan operation synchronization clock signal which is faster than the main-scan synchronization signal and with a sub-scan operation synchronization clock signal which is faster than said main-scan operation synchronization signal. In comparison with the main-scan synchronization signal, the main-scan operation synchronization signal is faster at least by a factor of (integer part of proportion of size variation $\times \sqrt{2} + 1$). In the present embodiment it is 4 times faster (cf. FIG. 5C). Also in comparison with the main-scan operation synchronization signal, the sub-scan operation synchronization signal is faster at least by a factor of (interger part of proportion of size variation $\times \sqrt{2} + 1$)(cf. FIG. 5D). In the present embodiment, wherein said proportion is 1.6 times, the latter should be faster by $[1.6 \times \sqrt{2} + 1 = 3$ times. One-shot down counters 1, 2 shown in FIG. 24B release high-level signals during a counting operation, and releases low-level signals when the count reaches zero. There are further provided down counters 3, 4 in FIG. 24B. The interpolation process circuit executes the calcuation in the same manner as explained in the first embodiment.

The lattice point detection circuit shown in FIG. 24A utilizes the values $|\sin\theta|$ and $|\cos\theta|$ determined according to the rotation angle $\theta$, but there may also be employed a constant $K = \sqrt{2}$ independent of the rotation angle $\theta$, as shown in FIG. 14. In this case it is rendered possible to dispense with the setting of said values and therefore to reduce the magnitude of circuit.

Also the detection of output lattice point, for which the interpolation data are to be determined, can be effected by determining the address of main scan line in the converted coordinate system through a digital differential analysis and then determining the lattice points close to said line, one by one.

This process will be clarified in more detail in the flollowing, and, for the purpose of simplicity there will be considered an example of rotation of a line segment by 30° without size change, about the original point of the coordinate system.

Figure 28A:
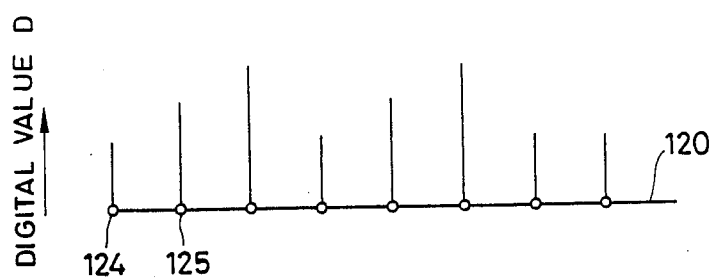
FIGS. 28A, 28B and 28C are schematic views showing comparison of density in output lattice points in the prior art and in this embodiment.
Figure 28B:
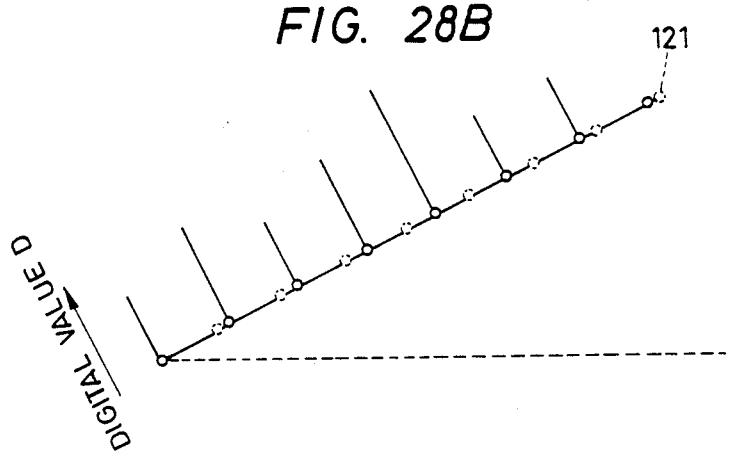
Figure 28C:
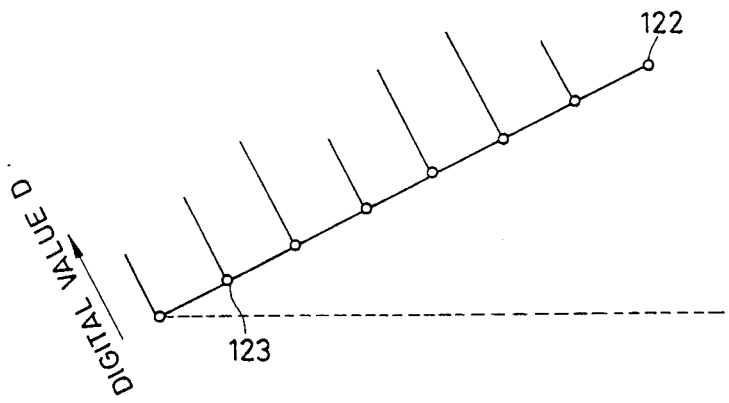

FIGS. 28A, 28B and 28C illustrate the mode of conversion of image data in this process, wherein the abscissas 120, 121, 122 indicate respective main scanning directions, circles indicate sampling points, and the ordinates indicate the value of multi-level data, for example image density. FIG. 28A shows an original image, while FIG. 28C shows a digital output image obtained by this process, and FIG. 28B shows an example conventional technology in which the original image is rotated without interpolation. In the following there will be explained an example of obtaining the value of multi-level data at a sampling point 123 in FIG. 28C.

Figure 29:
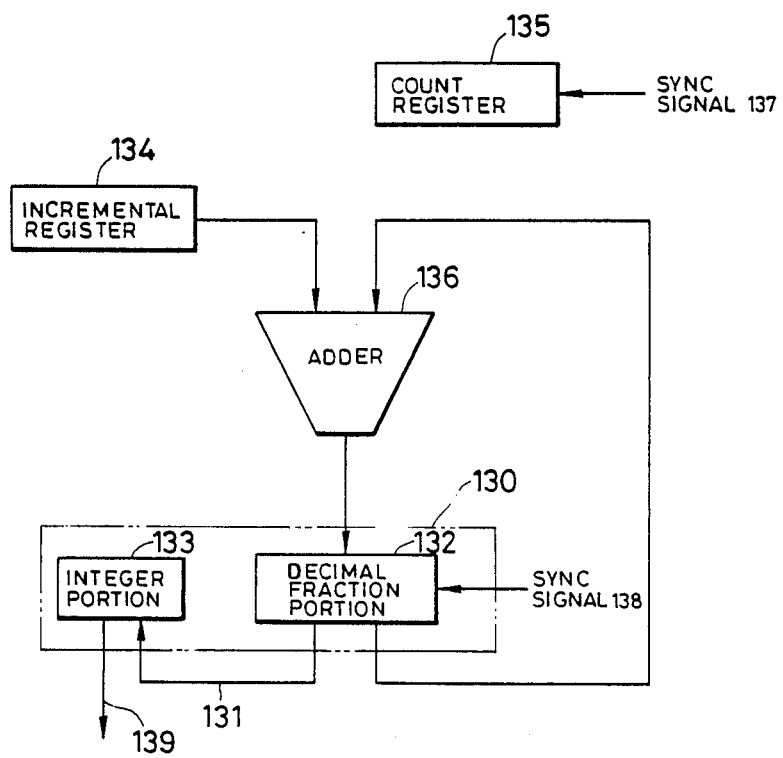
FIG. 29 is a block diagram of a front half of an address generating circuit of this embodiment.

FIG. 29 shows an example of the circuit for providing the address of a main scan line 122 of the output image shown in FIG. 28C. In the present example, for a rotation of 30° about the original point, values "0" are set in the integer portion 133 and the fractional portion 132 of a result register 130, while a value of tan 30°=0.577350 is set in an incremental register 134. Also the number of pixels in the main scan line of the output image is set in a count register 135. These values are calculated and set by unrepresented hardware or software. By supplying clock signals the same as synchronization signals 137, 138, the content of the incremental register 134 and the content of the fractional portion 132 of the result register are added, and the content 139 of the integer portion 132 of said result register 130 is released in the order of 0, 1, 2, 3, ... as the y-axis address of the main-scan line 122, as shown in FIG. 30.

Figure 36:
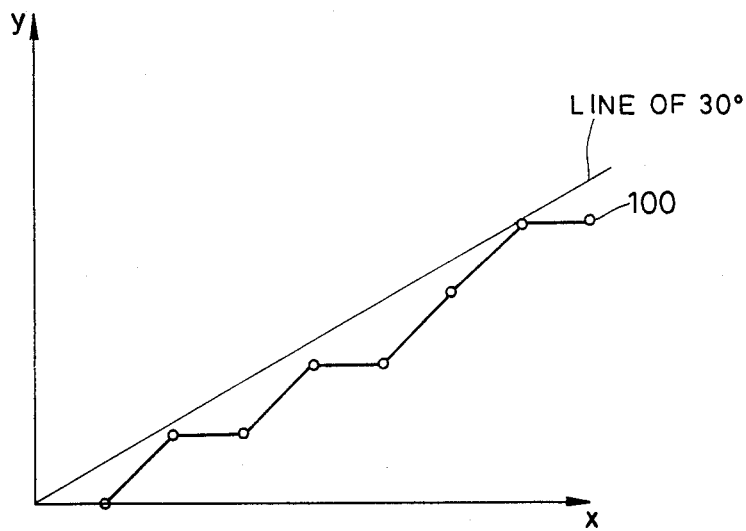
FIG. 36 is a chart of an approximated linear trajectory obtained by the circuit shown in FIG. 29.

As indicated by 100 in FIG. 36, the approximated line obtained in this manner always has a y-address for each x-address.

This logic circuit, composed solely of adding circuit, is inexpensive and can achieve a sufficiently high speed.

FIG. 31 shows a circuit for determining coordinates corresponding to the centers of pixels of the converted image, in the coordinate system of the original image, in response to a carry signal 131 shown in FIG. 29. X and Y values corresponding to a carry signal 131 "0", i.e., in a case of no change in the Y-address are calculated in the following manner:

$$X_0 = 1 \cdot \cos 30° + 0 \cdot \sin 30° = 0.866025$$

$$Y_0 = 1 \cdot (-\sin 30°) + 0 \cdot \cos 30° = -0.5$$

by unrepresented means and stored respectively in incremental registers 510, 530, while those corresponding to a carry signal "1", i.e., to a case of one increment of the Y-address are calculated in the following manner:

$$X_1 = 1 \cdot \cos 30° + 1 \cdot \sin 30° = 1.36625$$

$$Y_1 = 1 \cdot (-\sin 30°) + 1 \cdot \cos 30° = 0.36625$$

and stored respectively in incremental registers 520, 540. These values are calculated and set by hardware or software not shown in FIG. 31. X- and Y-result registers 550, 560 store "0" since the present example involves a rotation about the original point only. Then, same clock signals as synchronization signals 37, 38 shown in FIG. 29 are supplied to the circuit in this state, and, in response to the carry signal 131 shown in FIG. 29, the contents of the X- and Y-incremental registers are added respectively to those of the result registers to release the values of X and Y coordinates of the original image through signal lines 590, 591, as shown in a timing chart in FIG. 32. This logic circuit, solely composed of adding circuits, can be made inexpensive and can achieve a sufficiently high speed.

Finally FIG. 33 shows the concept of calculating a weighted average of two close points from the values 590, 591 of the X- and Y-coordinates obtained from the X- and Y-result registers shown in FIG. 31. In FIG. 33, m indicates the fractional portion of X-coordinate 590 shown in FIG. 31. The multi-level digital value Y of the coordinate 70 can be determined by:

$$Y_{70} = m \cdot X_{71} + (1-m) \cdot X_{72}$$

wherein $X_{71}$ and $X_{72}$ are multi-level digital values of pixel centers 71, 72 of the original image. Thus the multi-level digital value of the pixel 123 in FIG. 28C can be determined by introducing the multi-level digital values 124, 125 in FIG. 28A respectively into $X_{71}$ and $X_{72}$.

Figure 35:
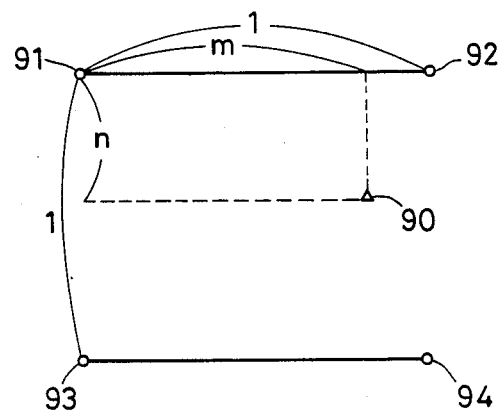
FIG. 35 is a schematic chart showing the method of weighted averaging in such apparatus.
Figure 37:
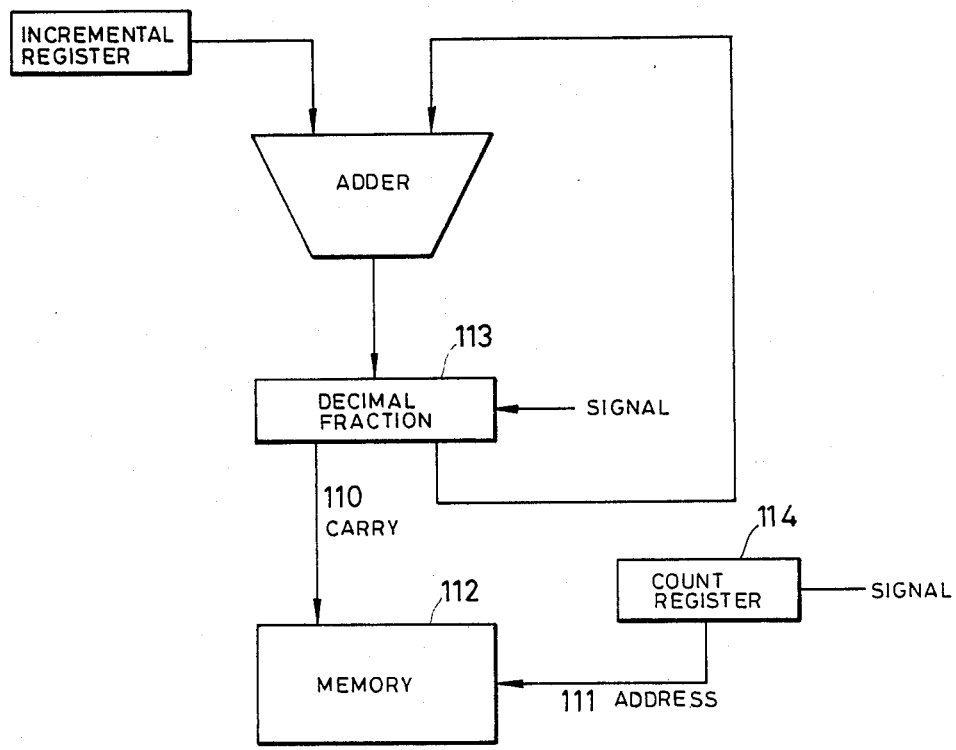
FIG. 37 is a schematic block diagram of an example of a conversion circuit of FIG. 35.

Though the foregoing explanation is related to rotation of a line segment without size change, it is also possible to rotate image data by employing three line buffers in the main scanning direction of the original image as shown in FIG. 34, also employing a circuit for determining an approximation for a line of the main scanning direction after conversion as shown in FIG. 37, saving a carry signal 110 released from a result register 113 in an address of a memory 112, designated by an address signal 111 from a count register 114, and supplying thus saved carry signal to a circuit shown in FIG. 31, thereby achieving interpolation for the output digital image in two-dimensional method as shown in FIG. 35, according to the following equation:

$$Y_{90} = (n \cdot X_{91} + (1-n) \cdot X_{93}) \cdot m + (n \cdot X_{92} + (1-n) \cdot X_{94}) \cdot (1-m).$$

In fact it can be easily achieved by repeating the steps of determining the coordinates in the original image and effecting an interpolation a number of times corresponding to the number of pixels in the sub-scan direction of the converted image.

Figures 38A, 38B:
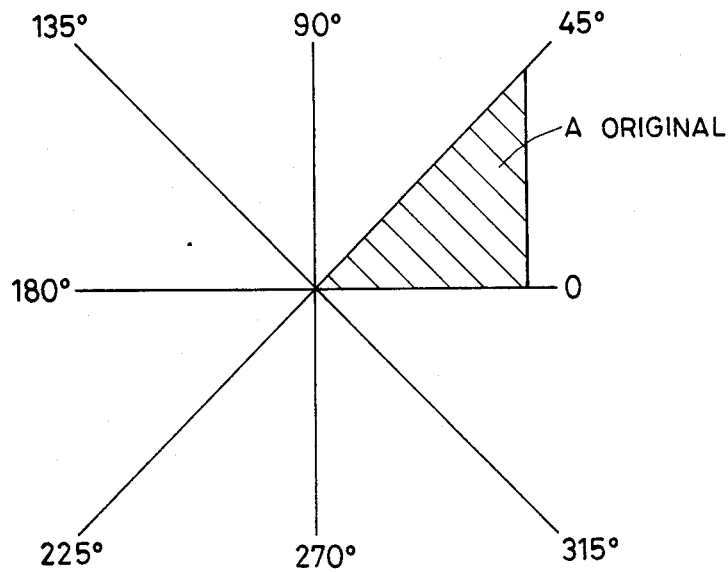
FIGS. 38A and 38B are a schematic view and a chart for explaining coordinate conversion.

A rotation angle in a range of 45° to 360° can be regarded as a variation of rotation of 0° to 45° according to a method shown in FIG. 38B. It is therefore possible also to increase the processing speed, by having a memory table of bit trains of the carry signals generated in the circuit shown in FIG. 37.

Though the foregoing example has been limited to an image rotation without size variation, it is also possible to achieve an image enlargement by slowing the input timing of the original image data according to the proportion of image enlargement, or an image reduction by increasing the number of line buffers shown in FIG. 34.

(Second Embodiment)

Figure 1A:
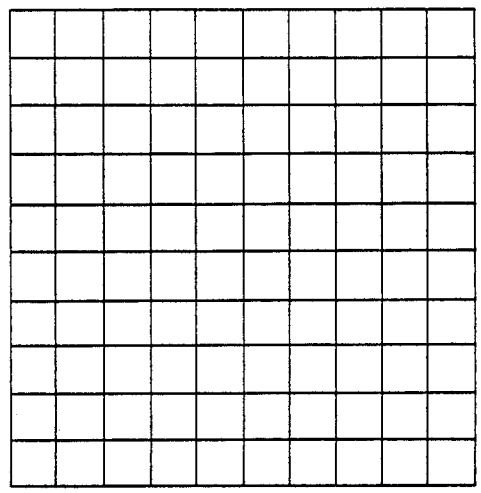
FIGS. 1A, 1B, 1C and 1D are schematic views showing drawbacks in the prior art.
Figure 1B:
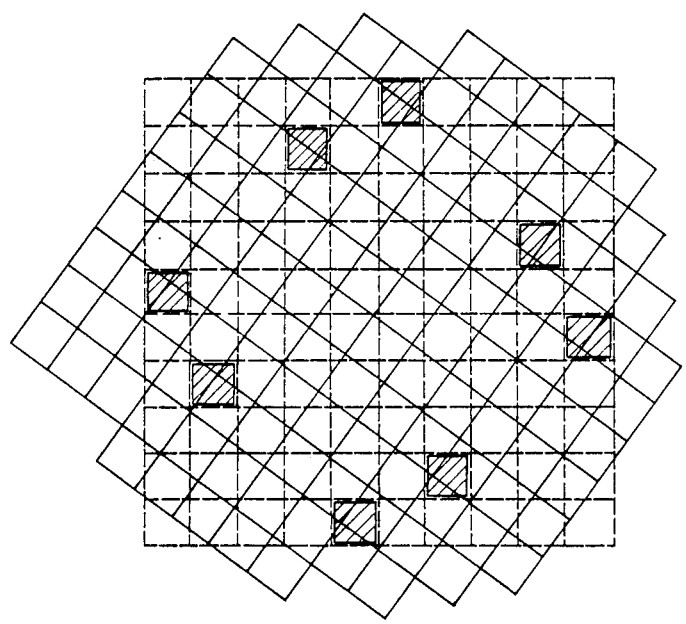
Figure 1C:
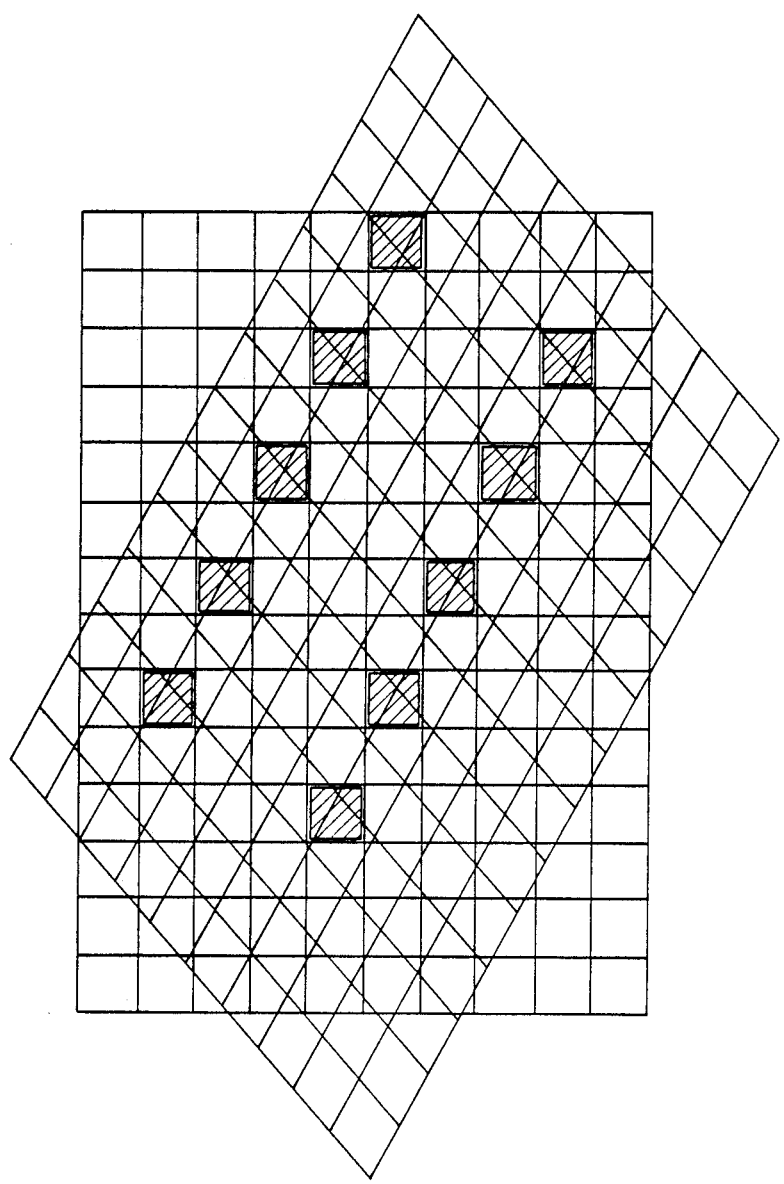
Figure 1D:
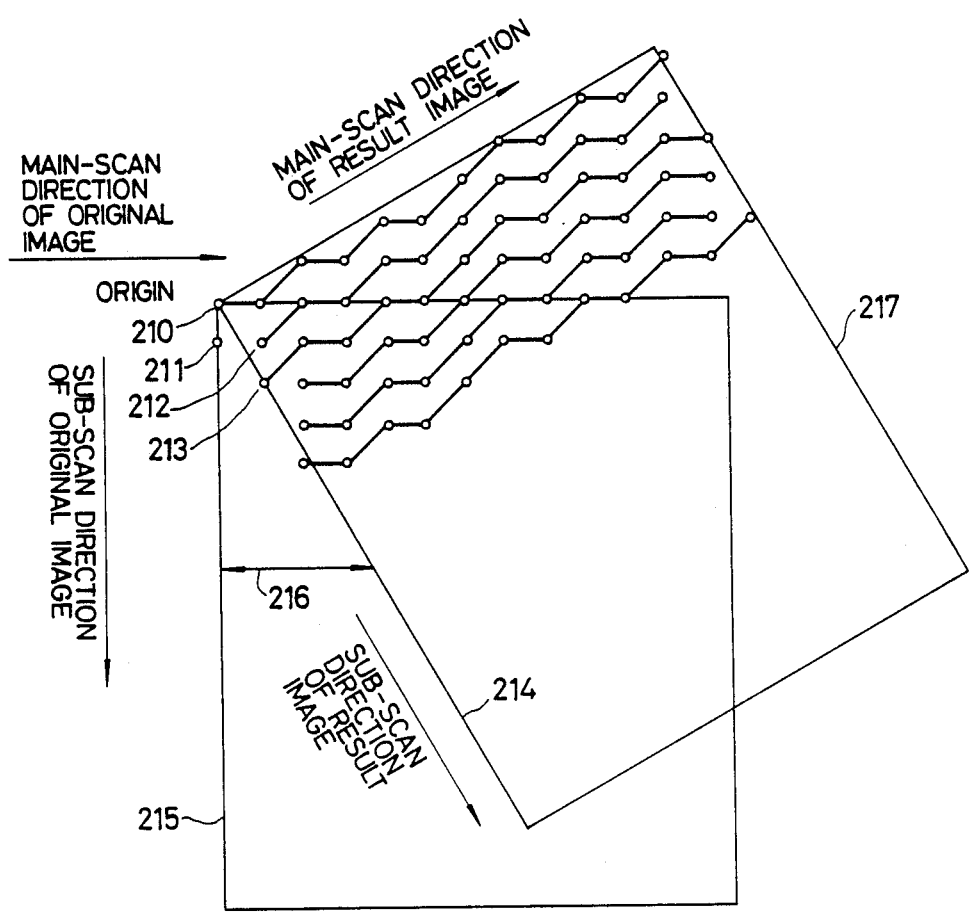
Figure 40:
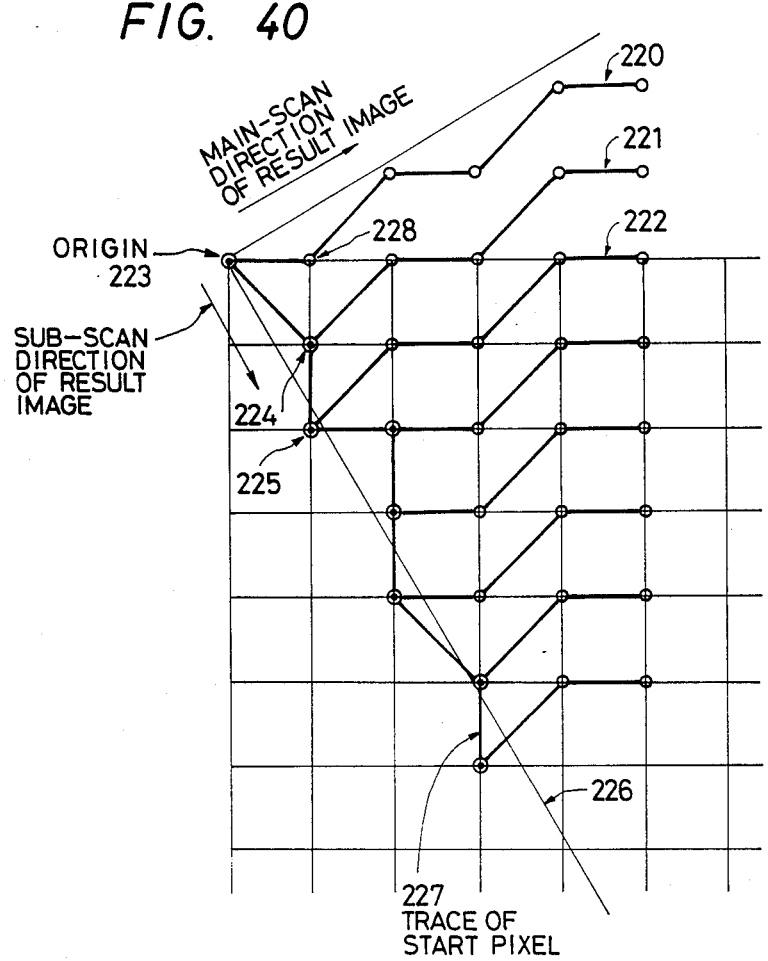
FIG. 40 is an enlarged view of the trajectory of start pixels.

The object of a second embodiment is, in a case where the coordinates of the output pixels of a processed digital image are irrational numbers including fractional portions, namely for a rotation of an arbitrary angle combined with enlargement or reduction of an arbitrary proportion, to match the addresses of the output pixels of the processed digital image with the input timing of the original digital image, or to determine the addresses of said output pixels in synchronization with the signal of the original digital image in the sub-scanning direction. The addresses of the output pixels of the processed digital image can be determined in various methods, but, in the present embodiment, digital differential analysis is employed to determine an address of the output pixel minimizing the distance from a line in the sub-scanning direction of the processed digital image to the address of the output pixels, and then to determine the address of a line in the main-scanning direction of the processed image, based on thus determined address of the above-mentioned output pixel as an initial value. This process will be explained in more detail in the following, wherein, for the purpose of simplicity, is considered a rotation of 30° about the original point without size change. FIG. 40 is an enlarged view of FIG. 1D around the original point therein, wherein circles indicate centers of pixels and double circles 223, 224, 225 indicate centers of starting pixels of rasters 220, 221, 222.

Figure 39:
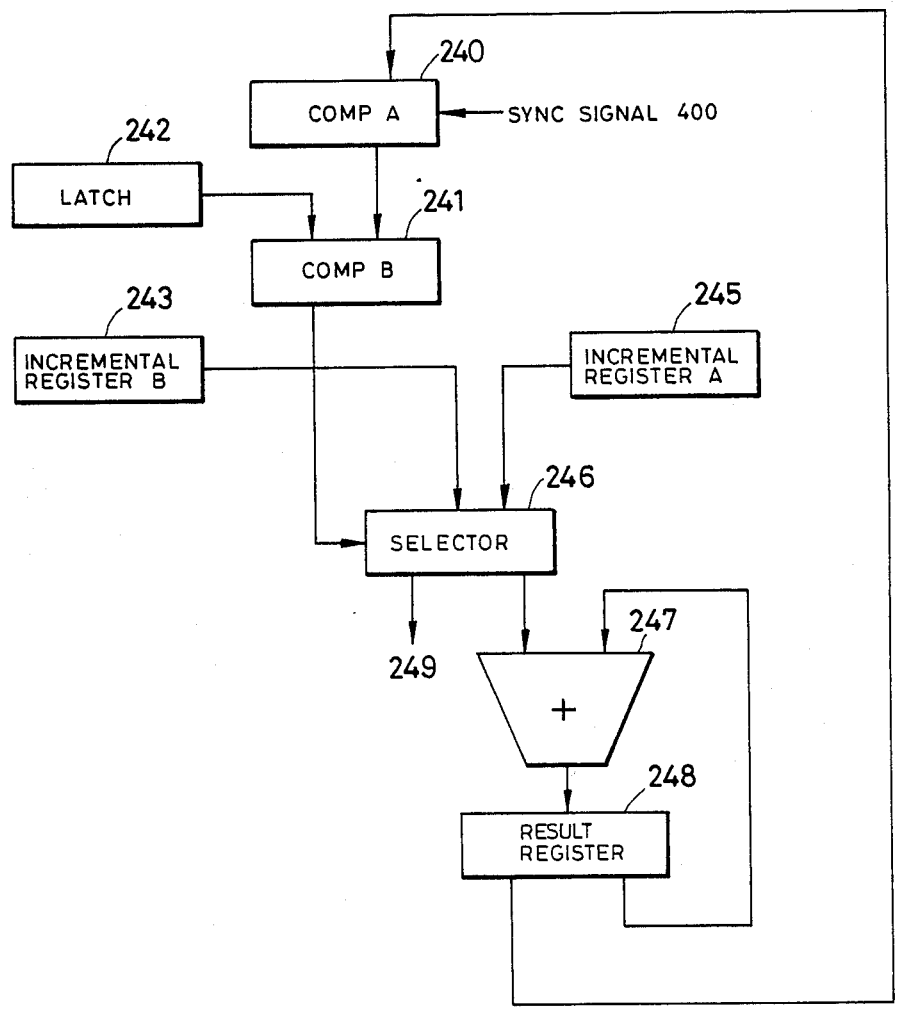
FIG. 39 is a block diagram of a second embodiment of the present invention, for determining the addresses of start pixels.
Figure 41:
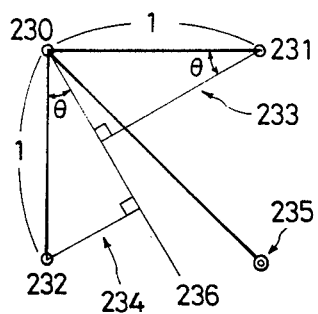
FIG. 41 is a schematic view showing the method of start address determination.

FIG. 41 shows the schematic process of determing the address of the center of a starting pixel, wherein 236 indicates a line of the sub-scanning direction of the processed image in FIG. 40. $\theta$ in FIG. 41 is equal to 30° in present example. 233 and 234 repectively indicate distance from the line 236, when pixel center moves from 230 to 231, or to 232. A thick line 227 in FIG. 40 indicates an address of the pixel center on each raster closest to the line 226, and FIG. 39 shows a circuit for determining each address.

In the following there will be explained a case of determining the address of the starting pixel 224, shown in FIG. 40. In FIG. 39, a latch retains the address increment "0" in the Y-direction of a pixel center 228 succeeding to the starting pixel 223 of an immediately preceding raster, or the raster 220 in FIG. 40, while an incremental register A 245 stores a value 233 in FIG. 41 or a value of cos 30°=0.8660, then an incremental register B 243 retains a value 234 in FIG. 41 or −sin 30°=−0.5, and a result register 248 retains the distance from the starting pixel of an immediately preceding raster to the line in the sub-scanning direction of the processed image or the distance "0" from the starting pixel 223 to the line 226 in FIG. 41. These values are calculated and stored by unrepresented hardware or software. A comparator 240 discriminates whether the content of the result register 248 is equal to zero or smaller. The result of the comparison is transferred to a comparator B 241, which discriminates whether the value in a latch 242 is zero when the value of the result register 248 is zero or less. These signals are transferred to a selector 246 which selects the value "−0.5" of the incremental register B 243 if the value of the result register 248 is larger than zero, or the value "0.8160" of the incremental register A 245 if the value of the result register 248 is zero or less and if the value of the latch 242 is one, or a value "0.366" which is equal to the sum of the values of registers 243, 245 if the value of the result register 248 is zero or less and if the value of the latch 242 is zero, and adds the thus selected value to the result register 248. Simultaneously it indicates the selected state by a signal 249. Also there is conducted step, by a hardware or software not shown in FIG. 41, of subtracting "1" from the Y-address of the starting pixel if the value of the result register 248 is larger than zero, or adding "1" to the X-address of the starting pixel if the value of the result register 248 is zero or less and if the value of the latch 242 is one, or adding "1" to the X-address and subtracting "1" from the Y-address if the value of the result register 248 is zero or less and if the value of the latch 242 is zero. In this manner there is determined the address of the starting pixel of each raster. The above-explained circuit, being composed of comparators and selectors, can be realized inexpensively and can achieve a sufficiently high speed.

Figure 42:
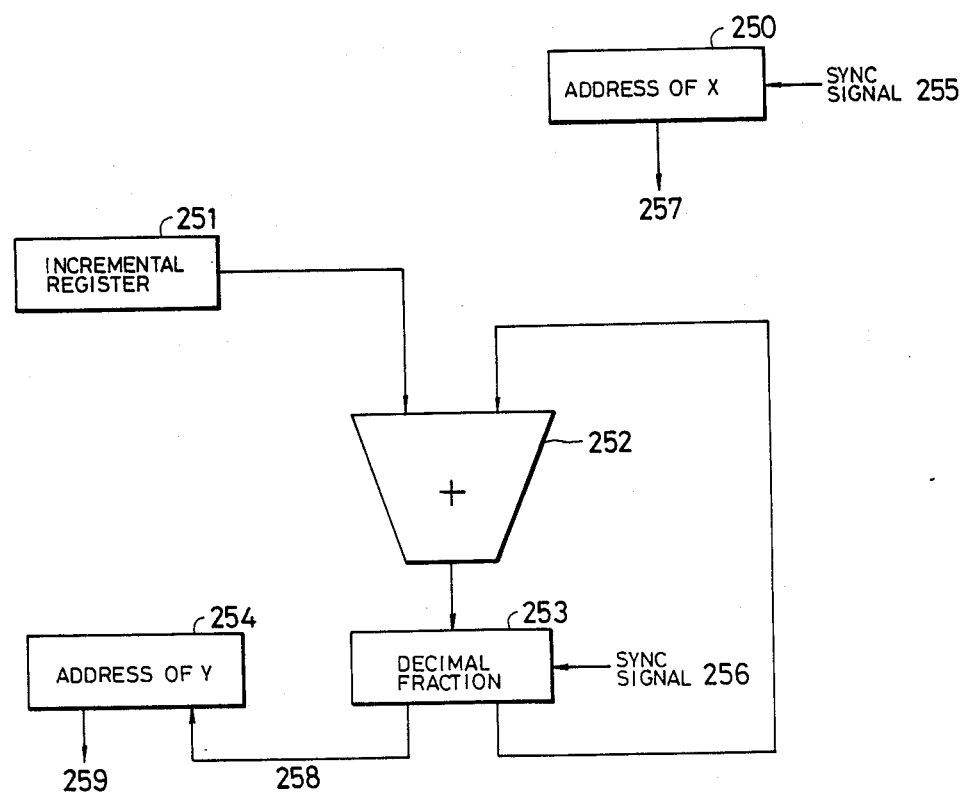
FIG. 42 is a block diagram of a circuit for determining a line in the main scan direction of the processed image.

Then, by hardware or software not shown in FIG. 42, the X- and Y-addresses of the output starting pixels determined above are respectively set in an X-address register 250 and a Y-address register 254 shown in FIG. 42, and a value of tan 30°=0.57735 is set in an incremental register 251. Subsequently a pixel clock signal is supplied as the synchronization signal 256, whereby the addresses of pixel centers of a line 221 which constitutes, as shown in FIG. 40, an approximated main-scan line, starting from the starting pixel, of the output image.

Simultaneously with the determination of the address of the center of each output pixel, there is conducted by hardware or software not shown in FIG. 42, steps of determining the pixels of the original image corresponding to the address of each output pixel and determining the pixel data of said output pixel from said pixels of the original image.

In the foregoing embodiment the address of the starting pixel of the output image is determined by selecting two increments, and by minimizing the distance from a line of the sub-scan direction of the output image, calculated from said increments. It is also possible, however, to determine the address of the starting pixel, as shown in FIG. 43, utilizing an expansion of the trigonometrical function tangent $$\tan\theta = \frac{1}{a} + \frac{1}{b} + \frac{1}{c} + \ldots \tag{2}$$

wherein a, b, c, ... are integers. For example, for $\theta = 30°$, there can be employed:

$$\tan 30° = \frac{1}{2} + \frac{1}{13} + \frac{1}{2341} \tag{3}$$

Figure 43:
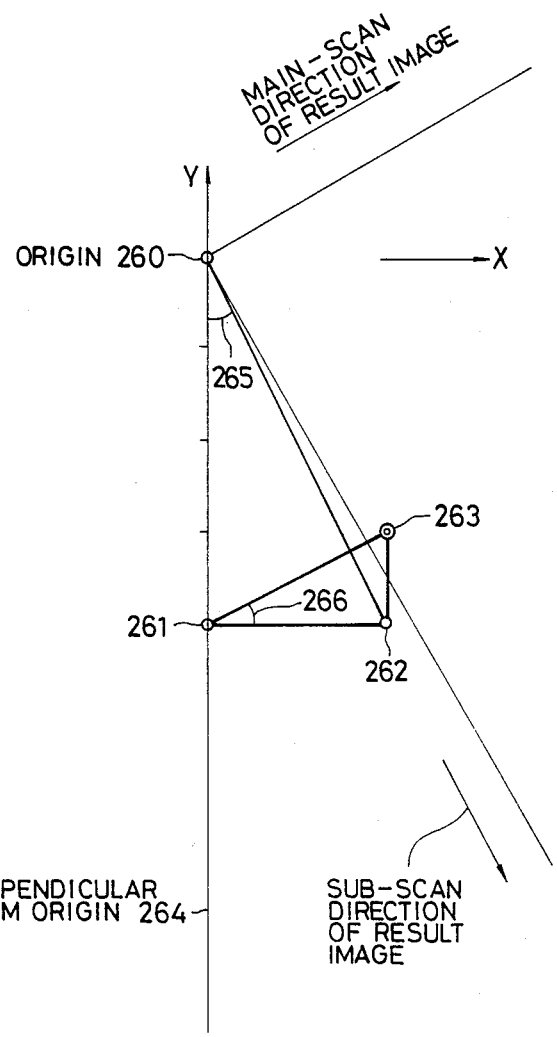
FIG. 43 is a schematic view showing the method of determining the address of start pixels.

FIG. 43 shows the process of determining the address of the starting pixel of a fourth raster of the output image, utilizing the above-mentioned expansion. There is considered a triangle containing a fourth point 261 from the original point on a vertical line 264 and a line 265 forming an angle of 30° to said line at the original point 260, and the X-address of a point 262 is determined in the following manner from the values of denominators:

$$\lfloor 4/2 \rfloor + \lfloor 4/13 \rfloor + \lfloor 4/2341 \rfloor = 2$$

wherein symbols ⌊ ⌋ indicates the truncation of fractional portion.

Figure 44:
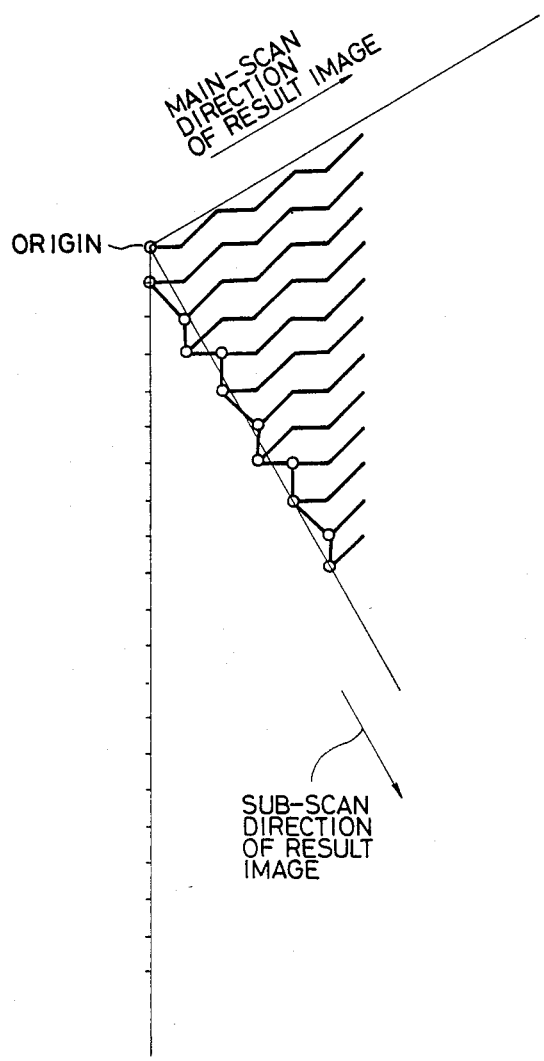
FIG. 44 is a view showing the trajectory of start pixels obtained according to the method of FIG. 43.

Then, the Y-address of an apex point 263 forming an angle 266 of 30° to a line between the points 261 and 262 is similarly determined by:

$$\lfloor 2/2 \rfloor + \lfloor 2/13 \rfloor + \lfloor 2/234 \rfloor = 1$$

in this manner the X- and Y-addresses of the starting pixel 63 can be determined. FIG. 44 shows an example of the starting pixels determined in this process, wherein white circles indicate starting pixels.

Consequently a rotation of an arbitrary angle can be realized by storing the values of denominators of the equation (2) for an arbitrary angle in a memory. Also the precision of the expansion, or the magnitude of denominator can be limited by the maximum magnitude of the rotation. For example for a rotation corresponding to a resolution of 16 pels/mm on an A4 - sized sheet, the denominator can be limited to 4752.

As explained in the foregoing, addition of an image processing apparatus containing a circuit for generating the addresses of output start pixels allows easy processing of a high-quality image in synchronization with input image data.

FIGS. 45 to 57 illustrate a third embodiment of the present invention.

Figure 46:
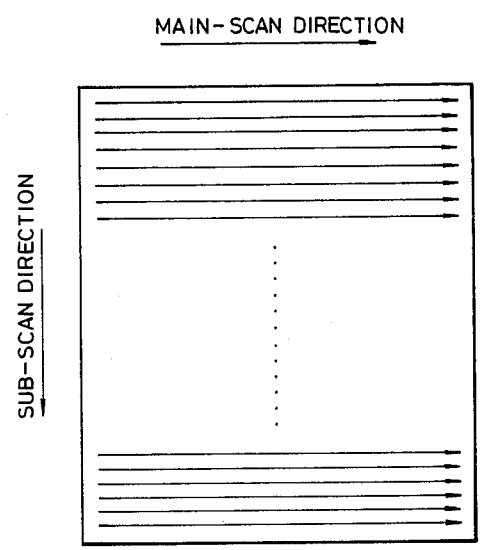
FIG. 46 shows scanning directions of an image.

FIG. 46 shows a scan image as input data source, with main and sub-scanning directions, wherein arrows indicate scan lines.

Figure 45:
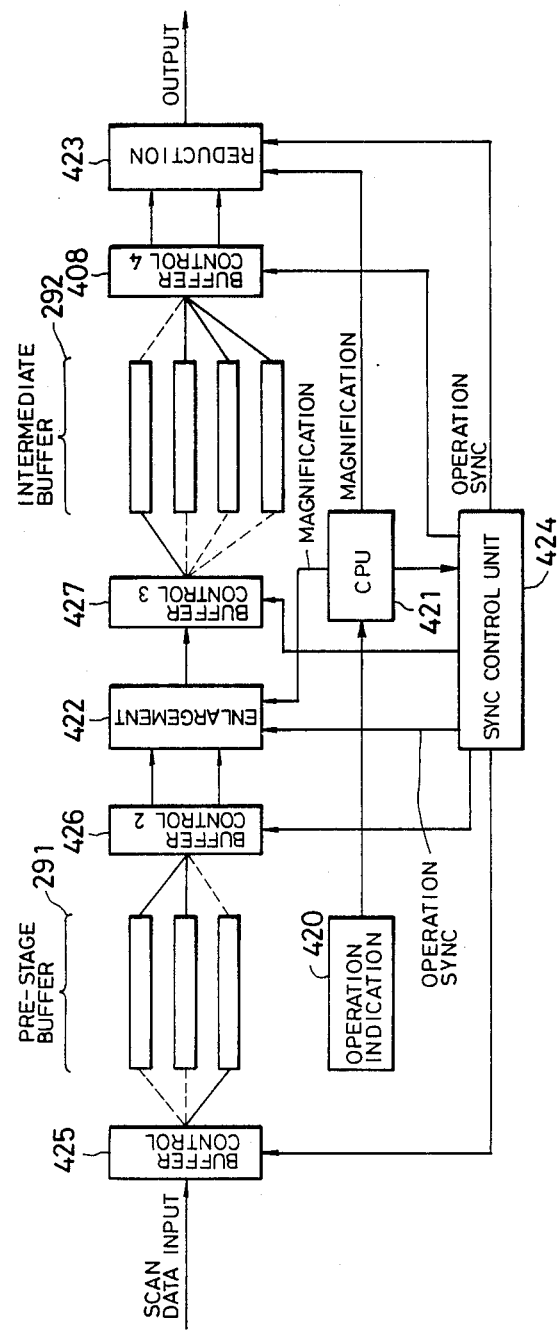
FIG. 45 is a block diagram of the entire apparatus.

FIG. 45 is a block diagram of an entire image processing apparatus. Scan data of two lines are entered via a pre-stage buffer 291, from which data interpolated for an image enlargement of $2^n$ times are supplied in succession to an intermediate buffer 292. It stores data of 3 lines from which there are obtained final enlarged or reduced data for fine reduction.

Now reference is made to FIG. 46. According to an instruction given by the operator, a proportion of image enlargement is set in a $2^n$ image enlarging circuit 422, and a proportion of image reduction is set in a fine reduction circuit 423. Also a synchronization control unit 424 is so set to slow the main-scan synchronization clock signal according to the areal image magnification, which is the product of the proportions of image enlargement in the main and sub-scanning directions set in the circuit 422. The scan data are fetched in three prestage buffers 291 which are switched in synchronization with the sub-scanning. The $2^n$ enlarging circuit 422 receives the scan data of two lines already stored in two pre-stage buffers 291, and scan data are fetched in the remaining prestage buffer while said circuit 422 conducts image enlarging process on the scan data from two pre-stage buffers.

Figure 47:
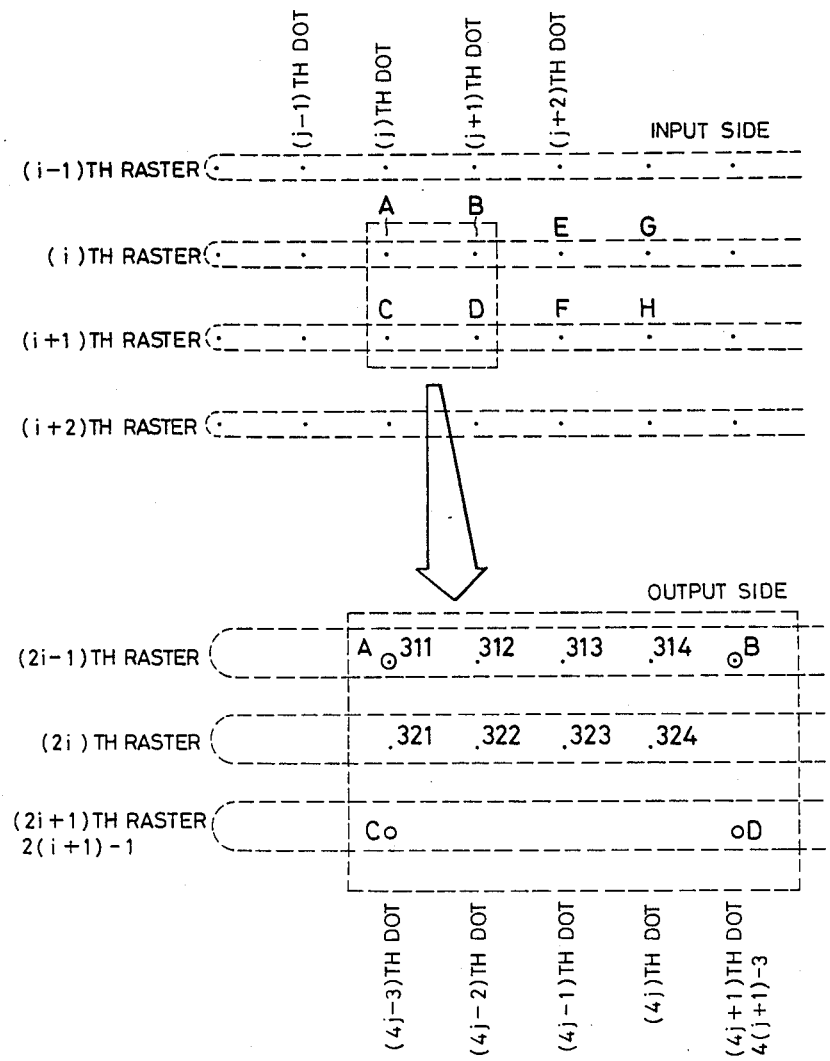
FIG. 47 is a schematic view showing the relationship of input and output data in image enlargement or reduction.
Figure 48:
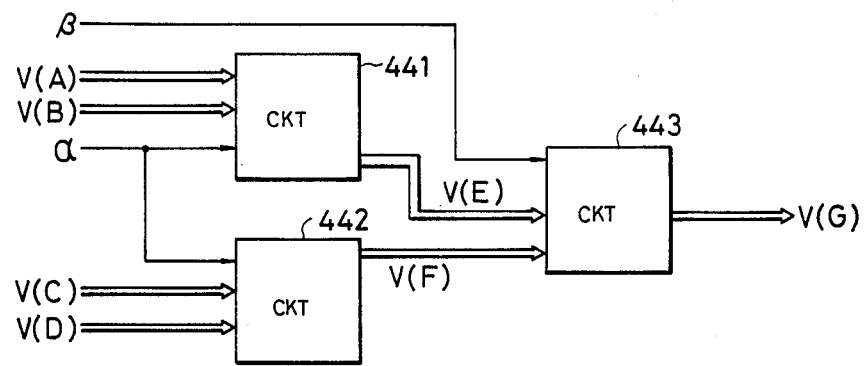
FIG. 48 is a circuit diagram for preparing interpolation data.
Figure 49:
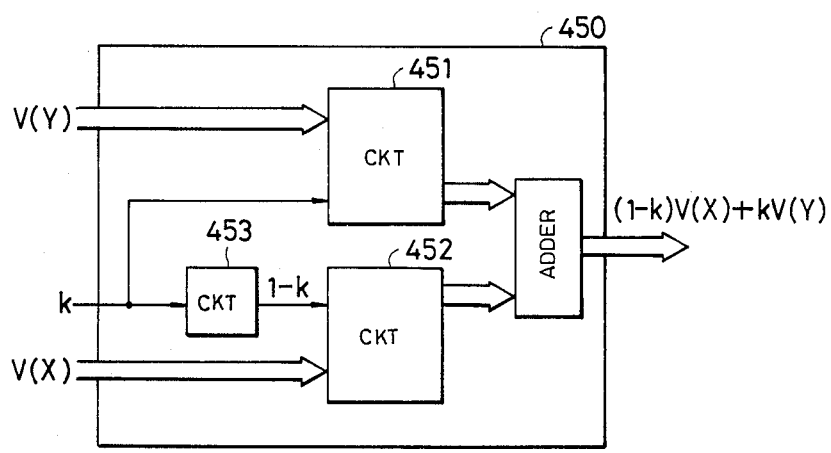
FIG. 49 is a more detailed view of the circuit shown in FIG. 48.
Figure 50:
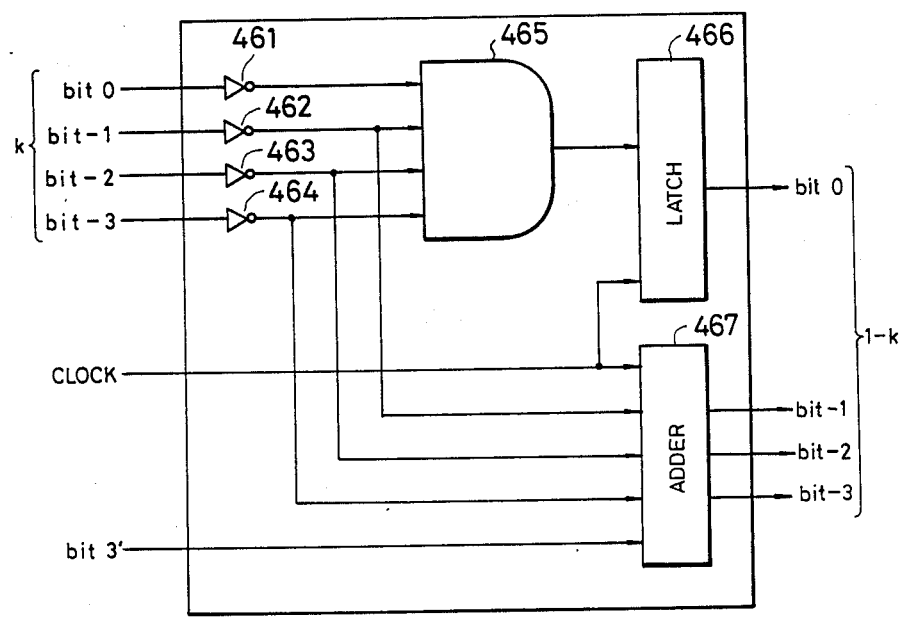
FIGS. 50 and 51 are further detailed views of the circuit shown in FIG. 49.
Figure 51:
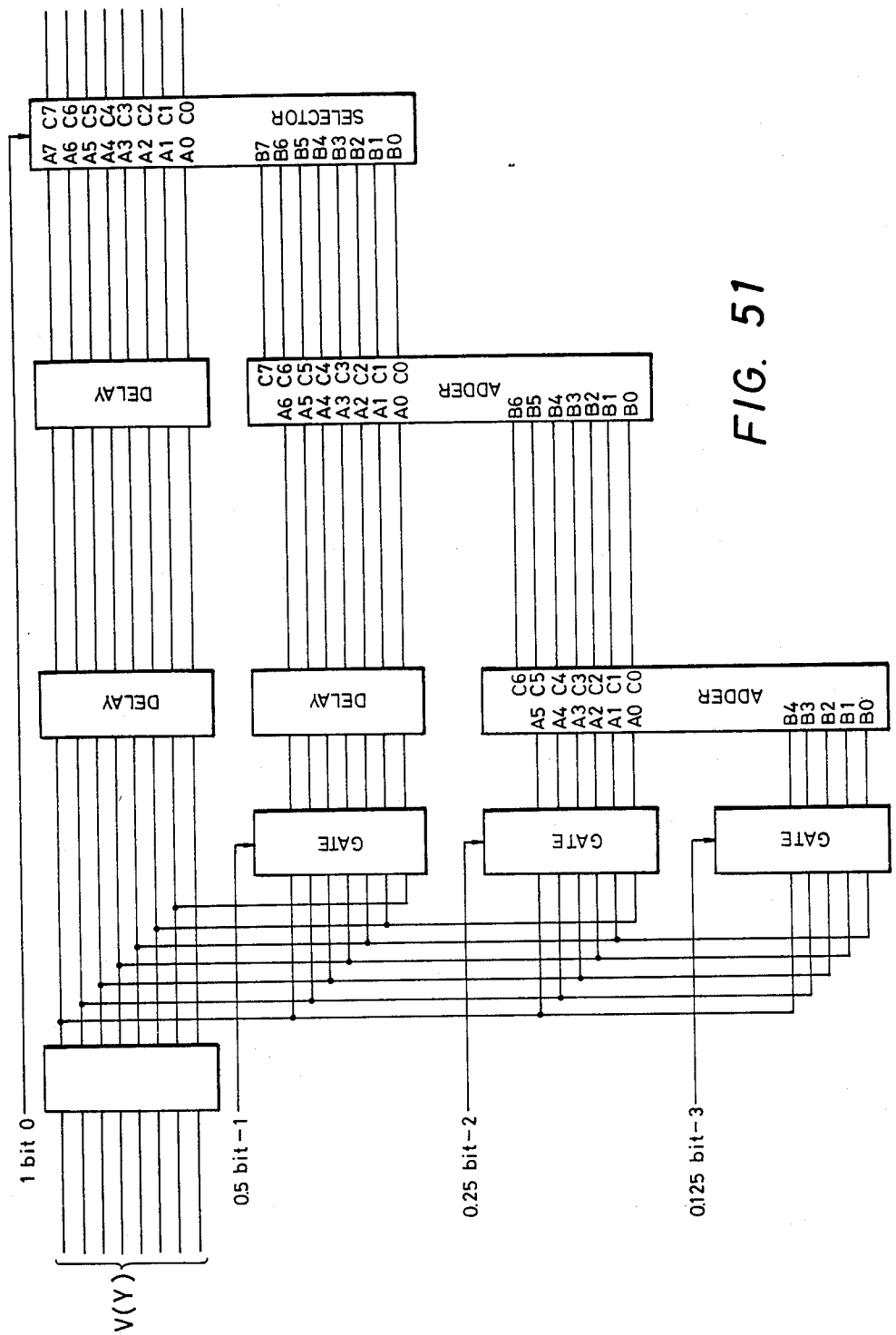
Figure 52:
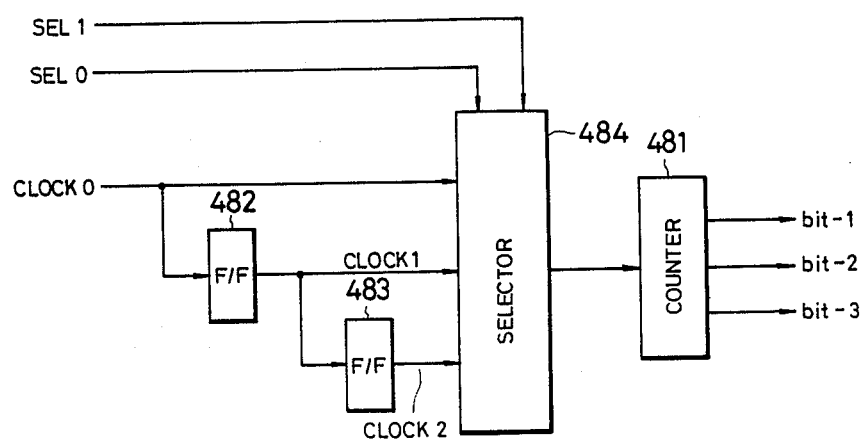
FIGS. 52 and 53 are a circuit diagram and a timing chart for interpolation ratio generation.
Figure 53:
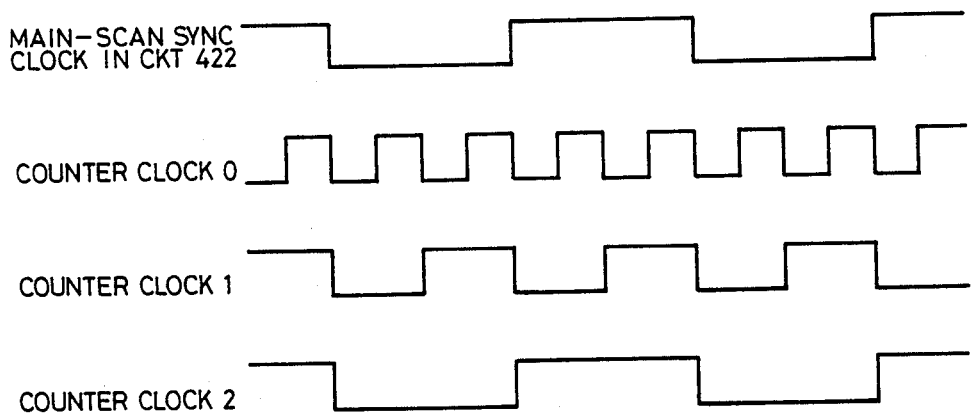

FIG. 47 shows an example of enlarging the input image 4 times in the main scanning direction and 2 times in the sub-scanning direction. In FIG. 47, A, B, C and D correspond to the pixels of the original image, with respective image data V(A), V(B), B(C) and V(D). The pixels A and B are on a same raster, while the pixels C and D are on another raster. Dots 311-314 and 321-324 are output dots to be obtained by image enlargement, wherein 311-314 are on a same output raster while 321-324 are on another output raster. value V(Q) of a dot Q in said dots 311-314, 321-324 is defined by:

$$V(Q)=(1-\alpha)(1-\beta)V(A)+\alpha(1-\beta)V(B)+(1-\alpha)\beta V(C)+\alpha\beta V(D) \quad (1)$$

wherein $\alpha$ ($0 \leq \alpha$) is an interior division ratio of a line segment AB intersected by a line parallel to a line segment AC, and $\beta$ ($\beta \leq 1$) is an interior division ratio of a line segment AC intersected by a line parallel to a line segment AB. FIG. 48 is a block diagram of a circuit for calculation of the equation (1), wherein a block 441 calculates $(1-\alpha)V(A)+\alpha V(B)$, while a block calculates $(1-\alpha)V(C)+\alpha V(C)$, and a block 443 calculates $(1-\beta)\{(1-\alpha)+\alpha V(B)\}+\beta\{(1-\alpha)V(C)+\alpha V(D)\}=(1-\alpha)(1-\beta)V(A)+\alpha(1-\beta)V(B)+(1-\alpha)\beta V(C)+\alpha\beta V(D)=V(Q)$. FIG. 49 is a block diagram of the circuit block 441, 442 or 443, which are of a similar structure, which calculates $(1-k)V(X)+kV(Y)$ from input image data V(X) and V(Y) and an interior division ratio k. A circuit 453, of which details are shown in FIG. 50, calculates $1-k$ from k. The ratio k is a fractional number expressed in four bits and is selected from $0, \frac{1}{8}, \frac{1}{4}, \frac{3}{8}, \frac{1}{2}, \frac{5}{8}, \frac{3}{4}, \frac{7}{8}$ and 1. More specifically k is represented by 4-bit signals $x_0, x_{-1}, x_{-2}$ and $x_{-3}$ (each 0 or 1) as follows:

$$k = 1 \cdot x_0 + \frac{1}{2}x_{-1} + \frac{1}{4}x_{-2} + \frac{1}{8}x_{-3}$$

so that $1-k$ can be represented by a complement of k to 2. The circuit shown in FIG. 50 calculates $1-k$ by determining a complement of k to 2. This calculation is achieved by inverting respective bits by inverters 461-464 and adding 1 to the lowest bit wherein the highest bit assumes a value 1 only when k is zero, i.e. only when $x_0, x_{-1}, x_{-2}$ and $x_{-3}$ are all zero. FIG. 51 shows the details of the circuit 451 or 452, which are constructed the same. The circuit 451 or 452 generates data A by extracting, from the input image data, the upper 7 bits thereof shifting them to lower bits respectively by one bit, and data C by-extracting upper 6 bits and shifting them to lower bits respectively by one bit. Among the aforementioned 4-bit fractional number, the bit of a digit of $\frac{1}{8}$ is used as a gate signal for the data C, that of a digit of $\frac{1}{4}$ as a gate signal for the data B, and that of a digit of $\frac{1}{2}$ as a gate signal for the data A. Each gate releases the input data if a corresponding gate signal is of high level, but releases zero if said gate signal is of low level. The sum of the outputs of the gates or the signal V(Y) is selected by the signal of a digit of 1 to obtain a product of the image data and the interior division ratio. The above-described operations are executed with the duration of an input-scan synchronization clock, so that said operations require a clock signal faster than said synchronization signal by the areal image magnification. FIG. 52 shows a circuit for successively generating $\alpha$ and $\beta$, which is composed an octanary up-counter 481, a clock signal 8 times faster than the $2^n$ enlarging circuit, a flip-flop 482 for dividing said clock signal into a half frequency, another flip-flop 483 for dividing the output of the flip-flop 482 into a half frequency, and a selector 484. The increment in $\alpha$ or $\beta$ is determined by selecting a clock signal, in response to a 2-bit selection signal supplied to the selector. Said selection signal is set in advance in a CPU according to the proportion of image enlargement. FIG. 53 is a timing chart showing the relation of clock signals in the circuit shown in FIG. 52. The increment of $\alpha$, $\beta$ is determined by employing the circuit shown in FIG. 52 for each of $\alpha$ and $\beta$. In this manner the enlarged data are prepared in succession and supplied, as scan data, to the intermediate buffer through a buffer control unit (3) 427.

Figure 54:
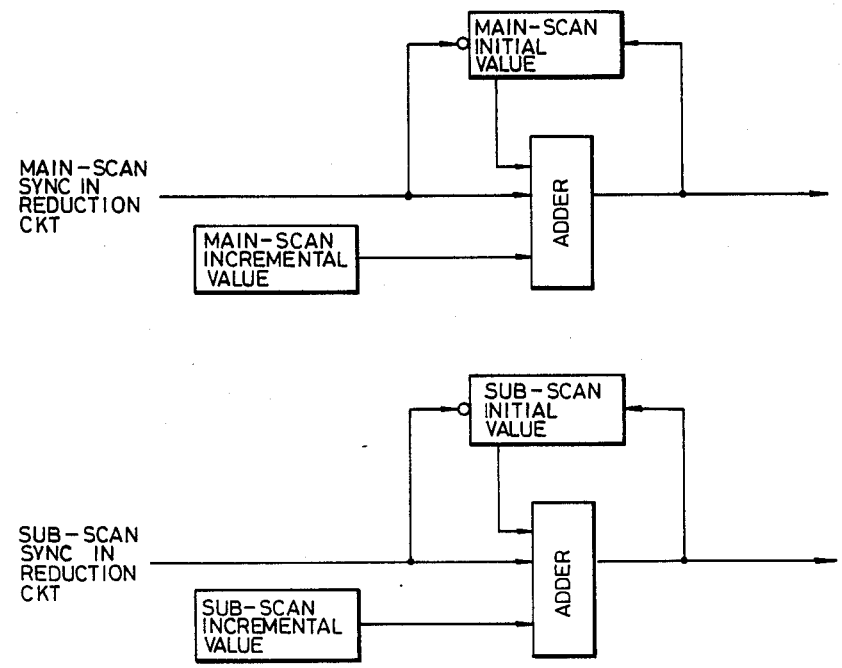
FIG. 54 is a circuit diagram for address calculation in a fine reduction circuit.
Figure 55:
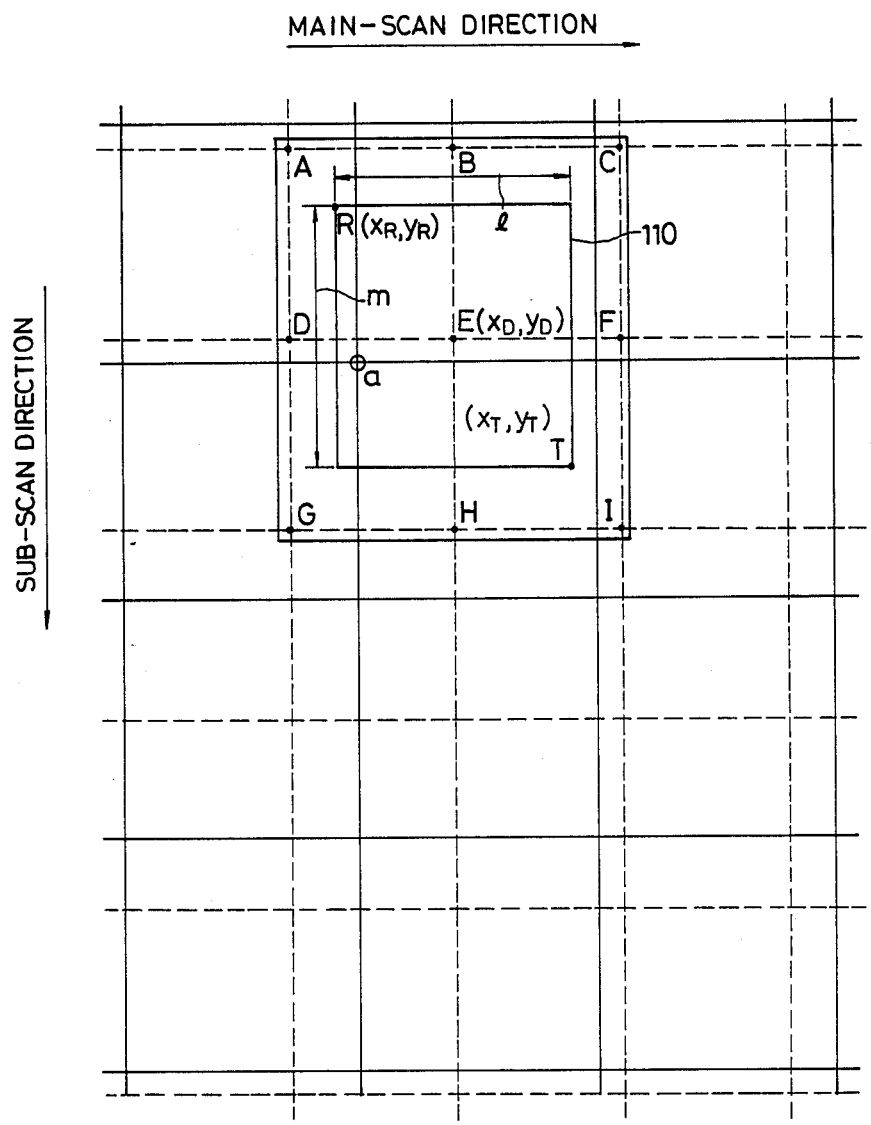
FIG. 55 is a schematic view showing the relation of input and output data of the fine reduction circuit.

In the following there will be explained the fine reduction circuit. In the image data prepared by the $2^n$ enlargement circuit, the main scanning direction and the sub scanning direction are respectively defined by x-axis and y-axis, and each pixel is defined by an address $(x_s, y_s)$. The proportion of image reduction in the main scanning direction is represented by $\delta$ ($\frac{1}{2} \leq \delta \leq 1$) and that in the sub-scanning direction is represented by $\epsilon$ ($\frac{1}{2} \leq \epsilon \leq 1$). The output address $(x_D, y_D)$ is given by:

$$x_D = \delta x_s + x_m \quad (2)$$

$$y_D = \delta y_s + y_m \quad (3)$$

wherein $x_m$ and $y_m$ indicate the amounts of parallel displacement along the main-scanning and sub-scanning directions. The coordinate $(x_s, y_s)$ indicates a pixel on a central one of three consecutive rasters of the intermediate buffer 292. The values $x_D$ and $y_D$ are generally not integers but have fractional portions. The image data are relased to an integer address in the vicinity of a position defined by said $x_D$ and $y_D$. Such integer address in the vicinity can be determined by a circuit shown in FIG. 54, and FIG. 55 illustrates the vicinity of the point $(x_D, y_D)$. A point E corresponds to $(x_D, y_D)$, while broken lines indicate the reduced state of the data in the intermediate buffer, while and solid lines indicate a lattice of integer address space of the output data. The vicinity of the point E is defined by a rectangle of lengths of l and m. In said vicinity area there exists an integer address point a. In the present example there are assumed conditions $l=\delta$ and $m=\epsilon$, and the point E is positioned at the center of said rectangle. The coordinate $(x_R, y_R)$ of a point R and the coordinate $(x_T, y_T)$ of a point T shown in FIG. 55 are obtained by a circuit shown in FIG. 58. The initial values and increments are selected in the following manner:

| Coordinate to be determined | Initial value | Increment |
|---|---|---|
| $x_R$ | $1 - \delta/2 + x_m$ | $\delta$ |
| $y_R$ | $1 - \epsilon/2 + y_m$ | $\epsilon$ |
| $x_T$ | $\delta/2 + x_m$ | $\delta$ |
| $y_T$ | $\epsilon/2 + y_m$ | $\epsilon$ |

For $x_R$ and $y_R$, the initial value includes "1" in order to obtain an integer address by truncation afterwards.

In the following there will be explained a process of calculating the output value. From an integer address $(x_D, y_D)$ in the vicinity there can be determined a corresponding input address $(x_s, y_s)$ by the following equations:

$$x_s = 1/\delta \cdot (x_D - x_m) = -1/\delta \cdot x_m + 1/\delta \cdot x_D \quad (4)$$

$$y_s = 1/\epsilon \cdot (y_D - y_m) = -1/\epsilon \cdot y_m + 1/\epsilon \cdot y_D \quad (5)$$

wherein $x_D$ and $y_D$ are integers, and $x_s$ and $y_s$ are real numbers containing fractional portions. Output data are obtained by an interpolation in the same manner as explained before, with an interpolation ratio p:q based on the fractional portions of $x_s$ and $y_s$, on the input image data of points corresponding to the integer parts of said $x_s$ and $y_s$ and to said integer plus one.

Figure 56:
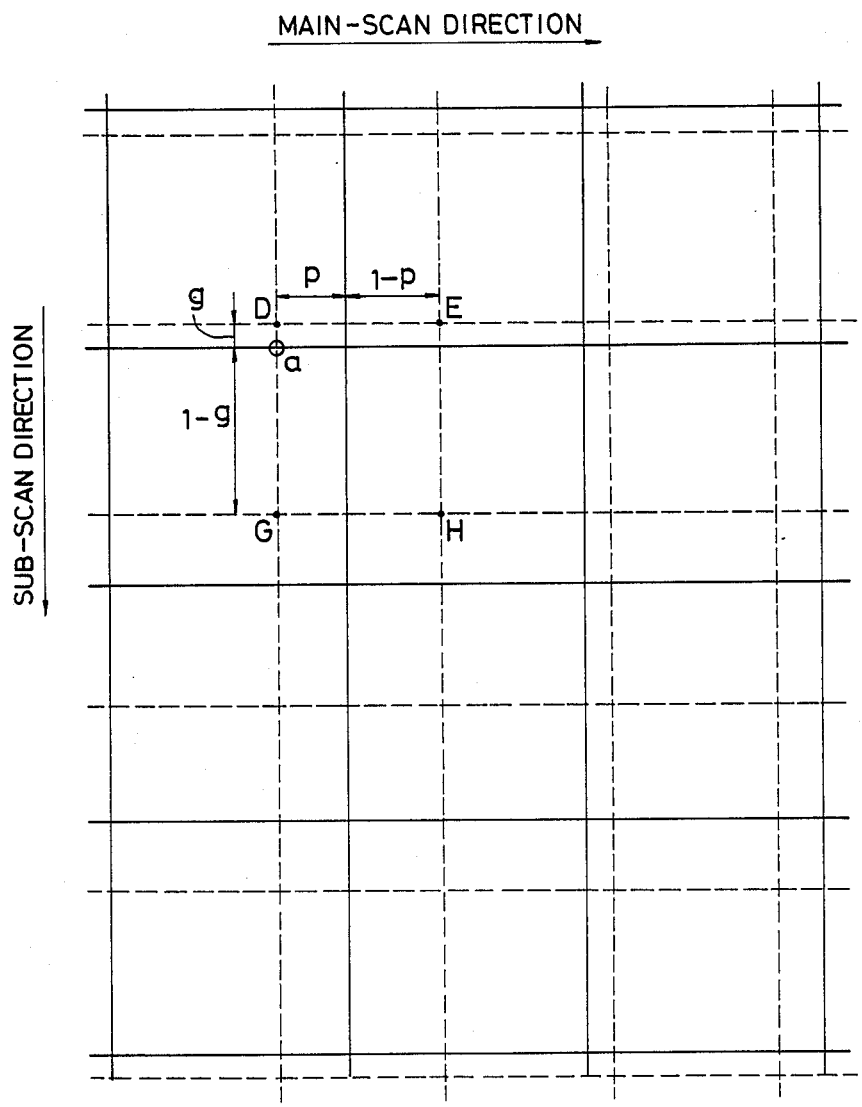
FIG. 56 is a schematic view showing the interpolation in the fine reduction circuit.
Figure 57:
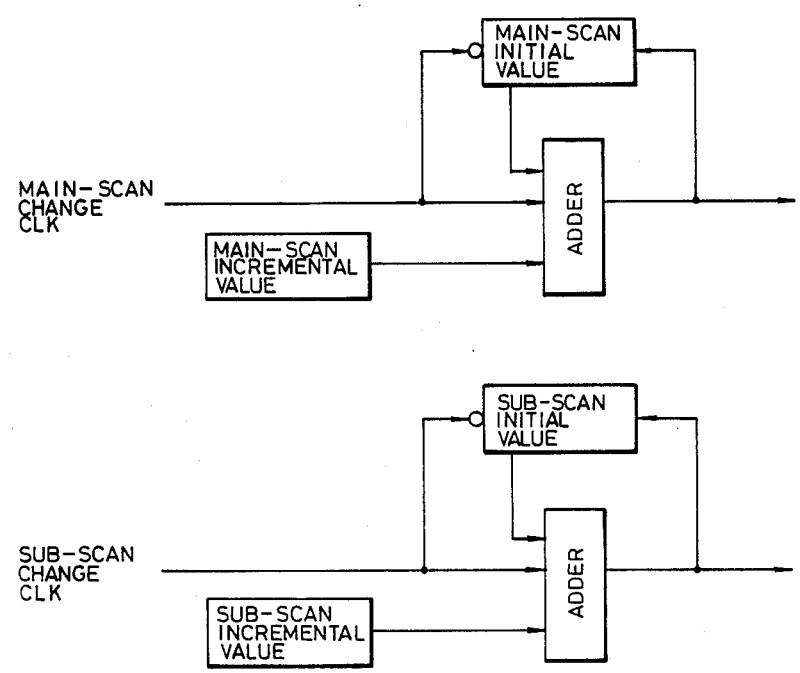
FIG. 57 is a block diagram of an address calculating circuit for inverse conversion in the fine reduction circuit.

More specifically, p is equal to the fractional portion of $x_s$ while q is equal to the fractional portion of $y_s$, and, for the foregoing example of the point a, integer points D, E, G and H are determined from $x_s$ and $y_s$ as shown in FIG. 56.

Consequently the value of the point $(x_D, y_D)$ is given by:

$$(1-p)(1-q)V(D) + p(1-q)V(E) + (1-p)qV(G) + pqV(H).$$

For the calculations of equation (4) and (5) there is employed a circuit similar to that shown in FIG. 54. When at least one of the integer portions of the outputs $x_R$, $x_T$ and outputs $y_R$, $y_T$ of FIG. 54 is charged and the integer portions become equal to each other, a pulse is generated as a clock of FIG. 55 from a not-shown circuit.

In these calculations the initial values and increments are selected as follows:

| Coordinate to be determined | Initial value | Increment |
|---|---|---|
| $x_s$ | $1 - 1/\delta + x_m$ | $1/\delta$ |
| $y_s$ | $1 - 1/\epsilon + y_m$ | $1/\epsilon$ |

As explained in the foregoing, the present invention provides an advantage of enabling an image rotation and/or an image size variation of a scan digital image synchronization with the scanning operation, without the use of a memory in the input side and with a minimized deterioration of image quality resulting from massing or misalignment of pixels of the image. Also the present invention enables an image rotation and/or image size variation in real-time basis on input scan data.

The present invention is not limited to the foregoing embodiments but is subject to various modifications and variations within the scope and spirit of the appended claims.

What we claim is:

1. An image processing apparatus comprising:
    first generating means for generating in synchronization with an input synchronization signal of source data, a destination address coordinate for said source data after processing;
    second generating means for generating destination addresses in the vicinity of said destination address coordinate, on the basis of an integer portion of said destination address coordinate;
    third generating means for generating source address coordinates corresponding to each of said destination addresses;
    fourth generating means for generating source addresses in the vicinity of each of said source address coordinates, on the basis of an integer portion of said source address coordinates; and
    fifth generating means for generating data corresponding to each of said destination addresses on the basis of the source data of said source addresses.

2. An image processing apparatus according to claim 1, wherein said fifth generating means is adapted to generate data by means of effecting an interpolation based on plural source data.

3. An image processing apparatus according to claim 1, wherein said first generating means is adapted to generate said destination address coordinate in accordance with a rotation angle of an image.

4. An image processing apparatus according to claim 1, wherein said third generating means is adapted to generate said source address coordinates, in accordance with a rotation angle of said image.

5. An image processing apparatus according to claim 1, wherein said first generating means is adapted to generate said destination address coordinate in accordance with a proportion of image size variation and a rotation angle of the image.

6. An image processing apparatus according to claim 5, wherein said third generating means is adapted to generate said source address coordinates, in accordance with said proportion of image size variation and a rotation angle of the image.

7. An image processing method for rotating a contemplated pixel of an image to be rotated through .a predetermined angle of rotation, comprising the steps of:
- obtaining a pixel position after the contemplated pixel is rotated;
- defining an area having its center at the center of said pixel position and having a lateral length equal to K times the pitch of output pixels representing the image after rotation, where K is a value dependent upon the angle of rotation;
- detecting output pixels in said area as an output pixel to be subjected to an interpolation; and
- determining interpolated values on the basis of data of rotated image in the vicinity of each of said output pixels to be subjected to interpolation, in successive manner in synchronization with an input main-scan synchronization signal.

8. An image processing method according to claim 7, wherein said area is a square.

9. An image processing method according to claim 7, wherein said value K is equal to $(|\cos \theta| + |\sin \theta|)$, in which $\theta$ is the rotation angle.

10. An image processing method according to claim 7, wherein said value K is equal to $\sqrt{2}$.

11. An image processing method comprising the steps of:
- selecting a predetermined pitch finer than the sampling pitch of an output image;
- obtaining a position after input image data is rotated;
- allotting rotated data to a coordinate corresponding to said predetermined pitch in accordance with the obtained position; and
- determining an output data value for each address in an address space corresponding to the sampling pitch on the basis of the data allotted on said coordinate.

12. An image processing method according to claim 11, wherein said output data value is obtained by interpolation of plural input image data values.

13. An image processing method according to claim 11, wherein said determining step is effected in synchronization with a main-scan synchronization signal of inputting image data.

14. An image processing method comprising the steps of:
- applying a predetermined process on a contemplated pixel of an input image to determine an output address thereof;
- determining, from said output address, an output pixel address of an output pixel in the vicinity thereof;
- setting an input address of the input image from said output pixel address;
- determining data value of said input address from plural input image data in the vicinity of said input address; and
- selecting the data value of said input address as the data value of the output pixel address.

15. An image processing method according to claim 14, wherein said output pixel address is determined from an output pixel position contained in an area of a predetermined size having its center at said output address.

16. An image processing method according to claim 15, wherein, in a case in which said predetermined process is an image rotation, said area of predetermined size is a square of a size equal to the product of the pitch of output pixels and $(|\cos \theta| + |\sin \theta|)$, in which $\theta$ is the angle of rotation.

17. An image processing method according to claim 15, wherein, in a case in which said predetermined process is an image rotation, said area of predetermined size is a square of a size equal to $\sqrt{2}$ times the pitch of output pixels.

18. An image processing method comprising the steps of:
- in effecting a size variation of $\alpha$ and $\beta$ times, respectively, in the main scanning and sub-scanning directions on an input scan image simultaneously with an image rotation, assuming a rectangle of a size of $\alpha K$ by $\beta K$, wherein K is a constant, in the position of a contemplated pixel in the image after said size variation and rotation; and
- determining the data of an output pixel present in said rectangular area by interpolation of values of plural input pixels in the vicinity of said output pixel.

19. An image processing method according to claim 18, wherein said constant K is equal to $(|\sin \theta| + |\cos \theta|)$, in which $\theta$ is the rotation angle of said image rotation.

20. An image processing method according to claim 18, wherein said constant K is equal to $\sqrt{2}$.

21. An image processing method according to claim 18, wherein said determining step effects interpolation in synchronization with a synchronization signal for the input scan image.

22. An image processing method according to claim 18, wherein said $\alpha$ and $\beta$ have independent values.

* * * * *

UNITED STATES PATENT AND TRADEMARK OFFICE
CERTIFICATE OF CORRECTION

PATENT NO. : 4,850,028
DATED : July 18, 1989
INVENTOR(S) : NAOTO KAWAMURA, ET AL.

Page 1 of 6

It is certified that error appears in the above-identified patent and that said Letters Patent is hereby corrected as shown below:

SHEET 5 OF 57

FIG. 3A, "SUB SCAN" should read --SUB-SCAN--.

SHEET 6 OF 57

FIG. 3B, "SUB SCAN" should read --SUB-SCAN-- (both occurrences).

SHEET 18 OF 57

FIG. 15A, "SUB SCAN" should read --SUB-SCAN--.

SHEET 19 OF 57

FIG. 15B, "SUB SCAN" should read --SUB-SCAN-- (both occurrences).

SHEET 28 OF 57

FIG. 22B, "SUB SCAN" should read --SUB-SCAN-- (both occurrences).

COLUMN 1

Line 15, "amount pro-" should read --amount of pro- --.
    Line 27, "a drawback" should read --the drawback--.
    Line 46, "sub scanning" should read --sub-scanning--.

UNITED STATES PATENT AND TRADEMARK OFFICE
CERTIFICATE OF CORRECTION

PATENT NO. : 4,850,028
DATED : July 18, 1989
INVENTOR(S) : NAOTO KAWAMURA, ET AL.

It is certified that error appears in the above-identified patent and that said Letters Patent is hereby corrected as shown below:

COLUMN 2

Line 17, "objects and" should read --objects,--.
    Line 20, "embodiments" should read --embodiments,--.

COLUMN 4

Line 59, "obtain" should read --obtains--.

COLUMN 5

Line 3, "obtain the relationships:" should read
        --obtains the relationship:--.

Line 31, "$\begin{bmatrix} \alpha(1 - \cos\theta), & \alpha\cos\theta \\ -\beta\sin\theta, & \beta(1 - \cos\theta) \end{bmatrix}$"

should read $$--\begin{bmatrix} \alpha(1 - \cos\theta), & \alpha\sin\theta \\ -\beta\sin\theta, & \beta(1 - \cos\theta) \end{bmatrix}--.$$

COLUMN 7

Line 16, "the" (first occurrence) should be deleted.
    Line 52, "scan off" should read --scan offset--.
    Line 54, "varration" should read --variation--.

UNITED STATES PATENT AND TRADEMARK OFFICE
CERTIFICATE OF CORRECTION

PATENT NO. : 4,850,028

DATED : July 18, 1989

INVENTOR(S) : NAOTO KAWAMURA, ET AL.

It is certified that error appears in the above-identified patent and that said Letters Patent is hereby corrected as shown below:

COLUMN 8

Line 3, "of fractional" should read --of the fractional--.
    Line 11, "the are" should read --are the--.
    Line 23, "of thus" should read --of the thus--.

COLUMN 9

Line 45, "in x-direction" should read --in the x-direction--.
    Line 50, "corresponds" should read --correspond--.

COLUMN 11

Line 17, "the" should read --be--.
    Line 59, "cordinate" should read --coordinate--.
    Line 66, "determined" should read --determine--.

COLUMN 12

Line 10, "signal" should read --signal.--.
    Line 21, "4 same" should read --same 4--.
    Line 23, "pixel" should read --pixels--.
    Line 28, "same size." should read --same size (no change in size).--.

UNITED STATES PATENT AND TRADEMARK OFFICE
CERTIFICATE OF CORRECTION

PATENT NO. : 4,850,028
DATED : July 18, 1989
INVENTOR(S) : NAOTO KAWAMURA, ET AL.

It is certified that error appears in the above-identified patent and that said Letters Patent is hereby corrected as shown below:

COLUMN 13

Line 29, "detecte" should read --detected--.
Line 39, "in" should read --is--.
Line 54, "difin-" should read --defin- --.

COLUMN 14

Line 3, "other" should read --the--.
Line 49, "[1.6x/2+1=3 times." should read --[1.6x/2]+1=3 times.--.
Line 51, "releases" should read --release--.
Line 54, "calcuation" should read --calculation--.

COLUMN 15

Line 2, "flollowing," should read --following,--.

COLUMN 17

Line 20, "determing" should read --determining--.
Line 62, "step, by a" should read --a step, by--.

COLUMN 18

Line 32, "tangent" should read --tangent:--.
Line 55, "symbols    indicates" should read --symbols L _J indicate--.
Line 63, "in" should read --In--.

UNITED STATES PATENT AND TRADEMARK OFFICE
CERTIFICATE OF CORRECTION

PATENT NO. : 4,850,028
DATED : July 18, 1989
INVENTOR(S) : NAOTO KAWAMURA, ET AL.

It is certified that error appears in the above-identified patent and that said Letters Patent is hereby corrected as shown below:

COLUMN 19

Line 44, "B(C)" should read --V(C)--.
    Line 61, "block calcu-" should read
         --block 442 calcu- --.
    Line 63, "$(1-\beta)\{(1-\alpha)+\alpha V(B)\}$" should read
         --$(1-\beta)\{(1-\alpha)V(A)+\alpha V(B)\}$--.

COLUMN 20

Line 8, "$k=1\cdot x_0+\tfrac{1}{2}x_{-1}+\tfrac{1}{4}_{-2}+\tfrac{1}{8}x_{-3}$" should read
         --$k=1\cdot x_0+\tfrac{1}{2}x_{-1}+\tfrac{1}{4}x_{-2}+\tfrac{1}{8}x_{-3}$--.
    Line 21, "by-extracting" should read --by extracting--.
    Line 37, "composed an" should read --composed of an--.
    Line 38, "octanary" should read --octonary--.
    Line 58, "sub scanning" should read --sub-scanning--.
    Line 67, "$y_D=\delta y_s+y_m$" should read --$y_D=\epsilon y_s+y_m$--.

COLUMN 21

Line 13, "while" should be deleted.

UNITED STATES PATENT AND TRADEMARK OFFICE
CERTIFICATE OF CORRECTION

PATENT NO. : 4,850,028
DATED : July 18, 1989
INVENTOR(S) : NAOTO KAWAMURA, ET AL.

It is certified that error appears in the above-identified patent and that said Letters Patent is hereby corrected as shown below:

COLUMN 22

Line 16, "image. Also" should read --image. ¶ Also--.

Signed and Sealed this

Twenty-first Day of August, 1990

Attest:

HARRY F. MANBECK, JR.

Attesting Officer    Commissioner of Patents and Trademarks